United States Patent
Lee et al.

(10) Patent No.: US 9,591,433 B2
(45) Date of Patent: Mar. 7, 2017

(54) COMMUNICATION METHOD, ELECTRONIC DEVICE, AND STORAGE MEDIUM

(71) Applicant: Samsung Electronics Co., Ltd., Suwon-si, Gyeonggi-do (KR)

(72) Inventors: Sang-Cheol Lee, Suwon-si (KR); Kyu-Hyun Kim, Suwon-si (KR); Soon-Hyun Cha, Seoul (KR); Sang-Min Bae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/625,414

(22) Filed: Feb. 18, 2015

(65) Prior Publication Data

US 2015/0245166 A1    Aug. 27, 2015

(30) Foreign Application Priority Data

Feb. 21, 2014  (KR) .................. 10-2014-0020914

(51) Int. Cl.
| | | |
|---|---|---|
| *H04B 7/00* | (2006.01) | |
| *H04W 4/00* | (2009.01) | |
| *H04M 1/725* | (2006.01) | |
| *H04W 4/16* | (2009.01) | |
| *H04W 88/04* | (2009.01) | |
| *H04W 76/02* | (2009.01) | |

(52) U.S. Cl.
CPC ......... *H04W 4/008* (2013.01); *H04M 1/7253* (2013.01); *H04M 1/72583* (2013.01); *H04W 4/16* (2013.01); *H04W 76/023* (2013.01); *H04W 88/04* (2013.01); *H04M 2250/62* (2013.01)

(58) Field of Classification Search
CPC ... H04W 4/008; H04W 76/023; H04W 88/04; H04M 1/7253
USPC .............................. 455/41.2, 575.6, 566, 567
See application file for complete search history.

(56) References Cited

U.S. PATENT DOCUMENTS

| | | | | | |
|---|---|---|---|---|---|
| 5,960,366 | A * | 9/1999 | Duwaer | ................. | G04G 21/04 368/13 |
| 6,714,233 | B2 * | 3/2004 | Chihara | ................. | H04B 1/385 348/14.01 |
| 7,809,406 | B2 * | 10/2010 | Weinans | ............. | H04M 1/7253 370/315 |
| 8,682,248 | B2 * | 3/2014 | Jeon | ..................... | H04B 5/0025 348/571 |
| 8,854,925 | B1 * | 10/2014 | Lee | ..................... | G04G 9/0005 368/10 |
| 8,862,166 | B2 * | 10/2014 | Kennard | ................. | H04W 4/14 348/189 |
| 8,988,973 | B2 * | 3/2015 | Lee | ..................... | G04G 9/0005 368/10 |
| 2002/0068600 | A1 * | 6/2002 | Chihara | ................. | H04B 1/385 455/557 |
| 2002/0115478 | A1 * | 8/2002 | Fujisawa | ............. | H04M 1/6505 455/567 |

(Continued)

FOREIGN PATENT DOCUMENTS

KR    20-0319924 Y1    7/2003

*Primary Examiner* — April G Gonzales
(74) *Attorney, Agent, or Firm* — Jefferson IP Law, LLP

(57) ABSTRACT

A method of performing communication by a first electronic device is provided. The method includes receiving an input for communication with a third electronic device, determining at least one of a first communication module of the first electronic device and a second communication module of a second electronic device for the communication with the third electronic device, and controlling the first or second communication module for the communication with the third electronic device in response to the input.

20 Claims, 17 Drawing Sheets

(56) References Cited

U.S. PATENT DOCUMENTS

| | | | |
|---|---|---|---|
| 2006/0258289 A1* | 11/2006 | Dua | G06F 17/30058 455/41.3 |
| 2007/0280200 A1* | 12/2007 | Patel | H04M 1/2535 370/352 |
| 2008/0070612 A1* | 3/2008 | Weinans | H04M 1/7253 455/517 |
| 2008/0167078 A1* | 7/2008 | Eibye | H04M 1/72522 455/566 |
| 2010/0123664 A1* | 5/2010 | Shin | G06F 1/1626 345/169 |
| 2010/0146463 A1* | 6/2010 | Cho | G06F 1/163 715/863 |
| 2011/0063105 A1* | 3/2011 | Bennett | A61B 5/0022 340/539.11 |
| 2012/0015604 A1* | 1/2012 | Abratowski | H04M 1/7253 455/41.2 |
| 2012/0050153 A1* | 3/2012 | Dvortsov | H04W 12/04 345/156 |
| 2012/0115542 A1* | 5/2012 | Griffin | H04W 8/205 455/552.1 |
| 2012/0158847 A1* | 6/2012 | Bertin | H04L 63/0492 709/204 |
| 2013/0065617 A1* | 3/2013 | Peled | H04W 8/205 455/466 |
| 2013/0095753 A1* | 4/2013 | Chen | H04B 5/00 455/41.1 |
| 2013/0300578 A1* | 11/2013 | Uchida | A61B 5/0022 340/870.02 |

\* cited by examiner

COMMUNICATION METHOD, ELECTRONIC DEVICE, AND STORAGE MEDIUM

CROSS-REFERENCE TO RELATED APPLICATION(S)

This application claims the benefit under 35 U.S.C. §119(a) of a Korean patent application filed on Feb. 21, 2014 in the Korean Intellectual Property Office and assigned Serial number 10-2014-0020914, the entire disclosure of which is hereby incorporated by reference.

TECHNICAL FIELD

The present disclosure relates to an electronic device having a communication function. More particularly, the present disclosure relates to a method and an apparatus for communicating with peripheral devices.

BACKGROUND

Electronic devices (for example, smart phones) can provide various application functions such as a clock, calendar, memo, search, map, news, real-time camera, and the like, as well as a communication function. A user can execute the various functions through the electronic device.

The electronic device may perform a communication function with a structurally standardized communication format using a modem.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide electronic devices (for example, smart phones, smart watches and/or the like) having communication functions and may desire to perform communication with another electronic device by using an electronic device based on a phone number of a second electronic device.

However, in the related art, the user could not select one of the electronic devices with which to use the communication function, or could only use a limited communication function.

In various embodiments of the present disclosure, the user may perform an operation of using the communication function of an electronic device which the user desires in a communication method between electronic devices.

In accordance with an aspect of the present disclosure, a method of performing communication by a first electronic device is provided. The method includes receiving an input for communication with a third electronic device, determining at least one of a first communication module of the first electronic device and a second communication module of a second electronic device for the communication with the third electronic device, and controlling the first or second communication module for the communication with the third electronic device in response to the input.

The determining of the at least one of the first communication module of the first electronic device and the second communication module of the second electronic device may include determining which one of the first and second communication modules will be used for transmitting a message based on communication related information.

The communication related information may include at least one of setting information of the first electronic device, a type of a communication signal, a location or a type of a Subscriber Identity Module (SIM), a connection state with an external electronic device, a user input, a power state, a charging state, a network state, and a phone plan.

The communication with the third electronic device may comprise a message including a contact number of the second electronic device according to a control of the second communication module.

The controlling of the first or second communication module may include transmitting a contact number of the third electronic device to the second electronic device, making a connection with the second electronic device, and making a connection with the third electronic device.

The connection with the second electronic device may be released in a state where the connection with the third electronic device is made.

The connection with the second electronic device may correspond to a call connection.

The method may further include displaying a screen part for selecting at least one of the first and second communication modules, and receiving an input for selecting at least one of the first and second communication modules by using the screen part.

The first electronic device and the second electronic device may perform short-range communication through BLUETOOTH (BT), WiFi, BLUETOOTH Low Energy (BLE), Near Field Communication (NFC), or ZigBee, or long-range communication through a wired or wireless network.

The method may further include making a connection with the second electronic device for short-range communication.

The method may further include displaying a first screen part for receiving the input for the communication with the third electronic device, and displaying a second screen part for selecting at least one of the first and second communication modules, wherein the first and second screen parts are displayed together on a display of the first electronic device.

The method may further include, displaying a second screen part for selecting at least one of the first and second communication modules, and storing information on the selection of the at least one of the first and second communication modules in a memory of the first electronic device.

The method may further include displaying a first screen part for receiving the input for the communication with the third electronic device, and displaying a second screen part for selecting at least one of the first and second communication modules, wherein the second screen part is displayed after the first screen part is displayed.

The displaying of the second screen part for selecting the at least one of the first and second communication modules may include displaying a first identification corresponding to the first communication module and a second identification corresponding to the second electronic device.

Each of the first and second identifications may be displayed by a contact number, a phone number, a name of a device or a module, a configured text, or a configured icon.

The controlling of the first or second communication module may include transmitting a first message to the first communication module, and communicating with the third electronic device through the first communication module by using at least some of information included in the first message, wherein the first message includes signal information for performing a call service, a message service, or a multimedia service.

The controlling of the first or second communication module may include transmitting a first message to the first communication module, and transmitting the first message to the second electronic device by using the first communication module, wherein the first message includes signal information for performing a call service, a message service, or a multimedia service.

The method may further include generating a second message related to the first message for the communication with the second electronic device, wherein the second message is transmitted to the second electronic device.

The method may further include receiving an input for displaying a communication record; and displaying together a first communication record related to communication between the first communication module and the third electronic device and a second communication record related to communication between the second communication module and the third electronic device in response to the input for displaying the communication record.

The first and second communication records may be displayed to be distinguished from each other.

The method may further include, when the connection between the first electronic device and the second electronic device is released, hiding or inactivating the second communication record.

In accordance with another aspect of the present disclosure, a non-transitory machine-readable storage medium recording is provided. The non-transitory machine-readable storage medium recording includes a program for performing the above method.

In accordance with another aspect of the present disclosure, an electronic device is provided. The electronic device includes the non-transitory machine-readable storage medium above.

In accordance with another aspect of the present disclosure, an electronic device is provided. The electronic device includes a first communication module configured to communicate of data or a message, and a processor configured to receive an input for communication with a third electronic device, to determine at least one of a first communication module of the first electronic device and a second communication module of a second electronic device for the communication with the third electronic device, and to control the first or second communication module for the communication with the third electronic device in response to the input.

In accordance with another aspect of the present disclosure, a method of performing communication by a second electronic device is provided. The method includes receiving a first message for communication with a third electronic device from a first communication module of a first electronic device, transmitting a first message to the second communication module of the second electronic device, and performing communication with the third electronic device by using at least some of information included in the first message.

The receiving of the first message may include receiving a second message related to the first message from the first electronic device, and obtaining the first message by using at least some of information included in the second message.

The method may further include at least partially re-configuring the first message to have a configuration which can be analyzed by the second communication module, wherein the re-configured first message is transmitted to the second communication module.

The first message may include a contact number of the third electronic device and the performing of the communication with the third electronic device comprises making a connection with the first electronic device and making a connection with the third electronic device.

The method may further include releasing the connection between the first and third electronic devices in a state where the first and third electronic devices are connected to each other.

In accordance with another aspect of the present disclosure, a non-transitory machine-readable storage medium recording is provided. The non-transitory machine-readable storage medium recording includes a program for performing the above method.

In accordance with another aspect of the present disclosure, an electronic device is provided. The electronic device includes the non-transitory machine-readable storage medium above.

In accordance with another aspect of the present disclosure, an electronic device is provided. The electronic device includes a second communication module configured to communicate data or a message, and a processor configured to receive a first message for communication with a third electronic device from a first communication module of a first electronic device, to transmit the first message to the second communication module, and to communicate with the third electronic device by using at least some of information included in the first message.

In various embodiments of the present disclosure, the user can perform an operation of using the communication function of an electronic device which the user desires in a communication method between electronic devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
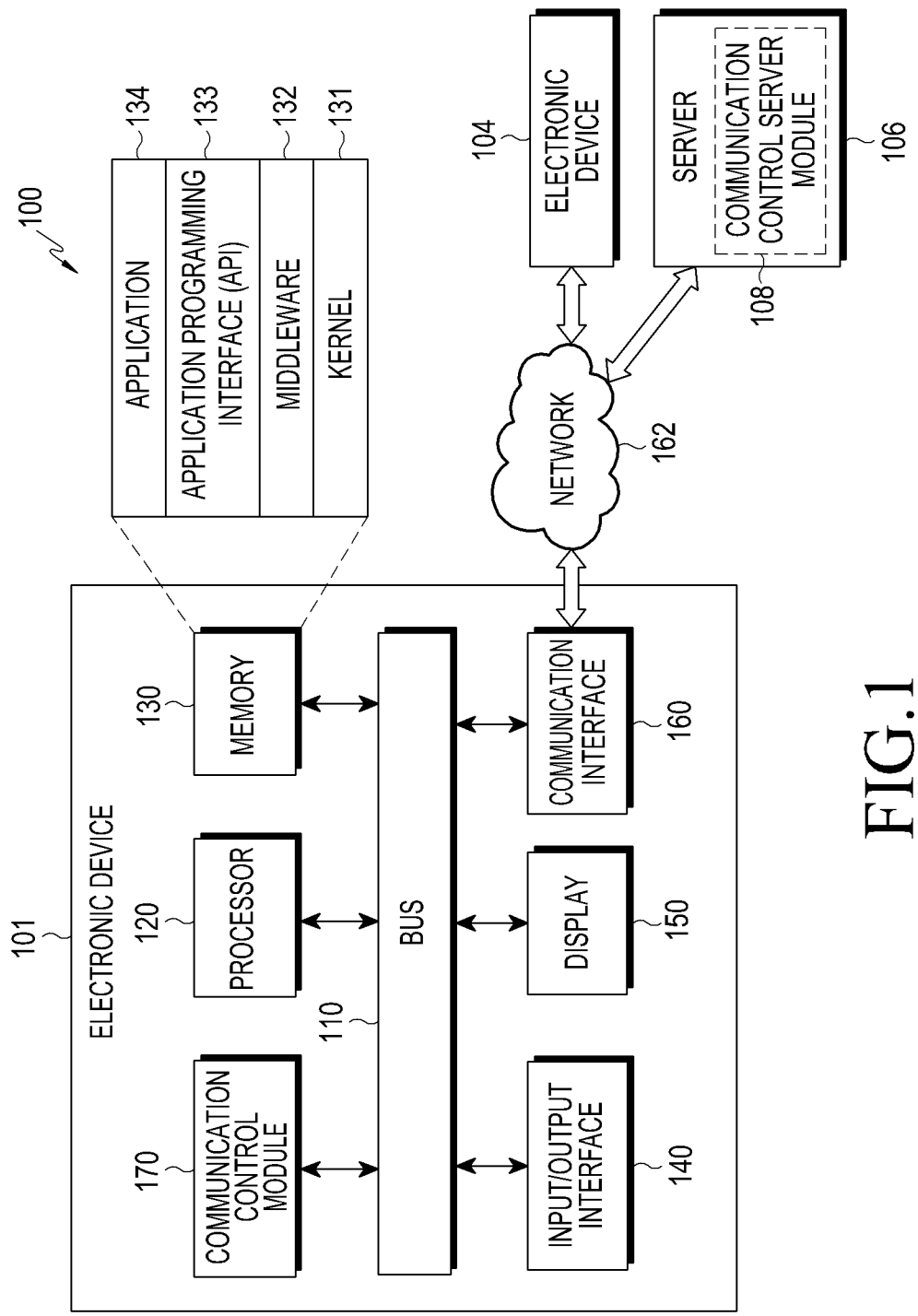
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "first," "second," or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms used in various embodiments of the present disclosure are merely used to exemplify a certain embodiment and should not limit various embodiments of the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to various embodiments of the present disclosure may be devices adopting a communication function. For example, the electronic devices may include at least one of (i.e., any one or a partial or whole combination of) smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

According to an embodiment, an electronic device may be a smart home appliance with a communication function. The smart home appliance as an example of the electronic device may include at least one of, for example, a television, a Digital Versatile Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to an embodiment, an electronic device may include at least one of various medical devices such as a Magnetic Resonance Angiography (MRA) scanner, a Magnetic Resonance Imaging (MRI) scanner, a Computed Tomography (CT) scanner, a scanner, an ultrasonograph, or the like, a navigation device, a Global Positioning System (GPS) receiver, an Event Data Recorder (EDR), a Flight Data Recorder (FDR), a vehicle infotainment device, an electronic equipment for a ship (for example a ship navigation device and gyro-compass and/or the like), avionics, a security device, a head unit for a vehicle, an industrial or household robot, an Automatic Teller Machine (ATM) in banking facilities or Point Of Sales (POS) in stores.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments will be described with reference to the accompanying drawings. The term "user" used in various embodiments may refer to a person who uses an electronic device or a device (for example, an artificial intelligence electronic device) which uses an electronic device.

FIG. 1 illustrates a network environment 100 including an electronic device 101 according to an embodiment of the present disclosure.

Referring to FIG. 1, the electronic device 101 may include a bus 110, a processor 120, a memory 130, an input/output interface 140, a display 150, a communication interface 160, and a communication control module 170.

The bus 110 may be a circuit connecting the above described components and transmitting communication data/signal/message (for example, a control message) between the above described components.

The processor 120 may receive a command from other components (for example, the memory 130, the input/output interface 140, the display 150, the communication interface 160, or the communication control module 170) through the bus 110, analyze the received command, and perform calculation or data processing according to the analyzed command.

The memory 130 may store commands or data received from or generated by the processor 120 or other components (for example, the input/output interface 140, the display 150, the communication interface 160, or the communication control module 170). The memory 130 may include programming modules such as, for example, a kernel 131, middleware 132, an Application Programming Interface (API) 133, or an application 134. Each of the programming modules described above may be configured by software, firmware, hardware, or a combination of two or more thereof.

The kernel 131 may control or manage system resources (for example, the bus 110, the processor 120, the memory 130, and/or the like) which are used for performing operations or functions implemented by other programming modules, for example, the middleware 132, the API 133 or the application 134. Further, the kernel 131 may provide interfaces by which the middleware 132, the API 133 or the application 134 may access each component of the electronic device 101 to control or manage them.

The middleware 132 may play an intermediate role between the API 133 or the application 134 and the kernel 131 to communicate with each other for transmission and reception of data. Further, in relation to requests for an operation received from the application 134, the middleware 132 may control (for example, scheduling or load-balancing) the requests for the operation by using, for example, a method of determining sequence for using system resources (for example, the bus 110, the processor 120, the memory 130, or the like) of the electronic device 101 with respect to at least one application among the application 134.

The API 133 is an interface by which the application 134 controls functions provided from the kernel 131 or the middleware 132, and may include, for example, at least one interface or function (for example, instructions) for file control, window control, image processing, or text control.

According to various embodiments, the application 134 may include a Short Message Service (SMS)/Multimedia Message Service (MMS) application, an e-mail application, a calendar application, an alarm application, a health care application (for example, an application for measuring an amount of exercise or blood sugar level), an environmental information application (for example, an application for providing atmospheric pressure, humidity, or temperature), or the like. Additionally or alternatively, the application 134 may be an application related to the exchange of information between the electronic device 101 and external electronic devices (for example, an electronic device 104). The application related to the information exchange may include, for example, a notification relay application for transmitting specific information to the external electronic device, or a device management application for managing the external electronic device.

For example, the notification relay application may include a function of transferring notification information generated in other applications (for example, the SMS/MMS application, the e-mail application, the health care application, or the environmental information application) of the electronic device 101 to external electronic devices (for example, an electronic device 104). Additionally or alternatively, the notification relay application may receive notification information from, for example, external electronic devices (for example, the electronic device 104) and provide the same to a user. The device management application may manage (for example, install, delete, or update) at least some functions (for example, turning external electronic device (or some elements) on or off, or adjusting a brightness (or resolution) of a display) of an external electronic device (for example, the electronic device 104) that communicates with the electronic device 101, applications performed in the external electronic device, or services (for example, a telephone service, or a messaging service) provided in the external electronic device.

According to various embodiments, the application 134 may include applications, which are designated according to the property (for example, the type of electronic device) of the external electronic device (for example, the electronic device 104). For example, when the external electronic device is an MP3 player, the application 134 may include an application related to reproduction of music. Similarly, when the external electronic device is a mobile medical device, the application 134 may include an application related to health care. According to an embodiment, the application 134 may include at least one of an application designated for the electronic device 101 or an application received from external electronic devices (for example, a server 106, or an electronic device 104).

The input/output interface 140 may transmit a command or data input from the user through an input/output device (for example, a sensor, keyboard, or a touch screen) to the processor 120, the memory 130, the communication interface 160, or the communication control module 170 through, for example, the bus 110. For example, the input/output interface 140 may provide the processor 120 with data for a user's touch which is input through the touch screen. Further, through the input/output device (for example, a speaker or a display), the input/output interface 140 may output commands or data received from the processor 120, the memory 130, the communication interface 160, or the communication control module 170 through the bus 110. For example, the input/output interface 140 may output voice data processed through the processor 120 to the user through the speaker.

The display 150 may display various pieces of information (for example, multimedia data or text data) for the user.

The communication interface 160 may make a communication connection between the electronic device 101 and external electronic devices (for example, the electronic device 104 or a server 106). For example, the communication interface 160 may be connected with a network 162 through wireless communication or wired communication to communicate with the external electronic device. The wireless communication may include at least one of WiFi, WiFi Direct, BLUETOOTH (BT), BLUETOOTH Low Energy (BLE), Near Field Communication (NFC), a Global Positioning System (GPS), or cellular communication (for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication may include at least one of, for example, a Universal Serial Bus (USB), a High Definition Multimedia Interface (HDMI), Recommended Standard 232 (RS-232), and Plain Old Telephone Service (POTS).

According to an embodiment, the network 162 may be a communication network. The communication network may include at least one of a computer network, the Internet, the Internet of things, or a telephone network. According to an embodiment, protocols (for example, a transport layer protocol, a data link layer protocol, or a physical layer protocol) for communication between the electronic device 101 and external electronic devices may be supported by at least one of the application 134, the API 133, the middleware 132, the kernel 131, and the communication interface 160.

According to an embodiment, the communication control module 170 may support driving of the electronic device 101 by conducting at least one of operations or functions implemented by the electronic device 101. For example, the server 106 may include a communication control server module 108 capable of supporting the communication control module 170 implemented in the electronic device 101. For example, the communication control server module 108 may include at least one component of the communication control module 170, and may perform (for example, perform as a proxy) at least one of the operations performed by the communication control module 170.

The communication control module 170 may process at least some of the information obtained from other components (for example, the processor 120, the memory 130, the input/output interface 140, or the communication interface 160) and utilize the same in various manners. For example, the communication control module 170 may control at least some functions of the electronic device 101 by using the processor 120 or independently from the processor 120 so that the electronic device 101 may interwork with other electronic devices (for example, the electronic device 104 or the server 106). The communication control module 170 may be integrated into the processor 120. According to an embodiment, at least one component of the communication control module 170 may be included in the server 106 (for example, the communication control server module 108) and receive at least one operation, which is performed by the communication control module 170, from the server 106. Additional information on the communication control module 170 is provided through FIG. 2 described below.

Figure 2:
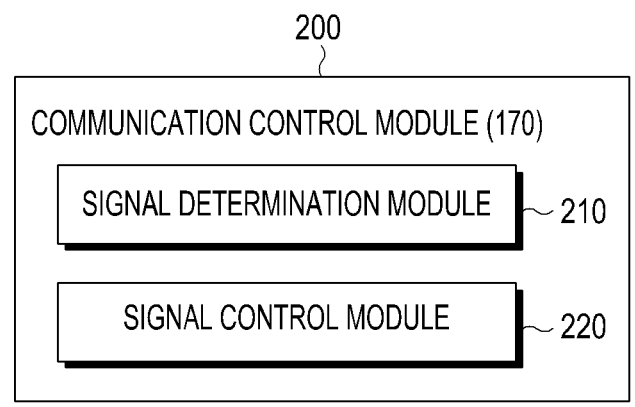
FIG. 2 is a block diagram of a communication control module of an electronic device according to an embodiment of the present disclosure.

FIG. 2 is a block diagram 200 of the communication control module 170 of the electronic device (for example, electronic device 101) according to an embodiment of the present disclosure. In the present embodiment, the electronic device corresponds to a first electronic device, a communication counterpart of the first electronic device corresponds to a third electronic device, and a device including a second communication module, which the first electronic devices desires to use for communication with the third electronic device, corresponds to a second electronic device.

Referring to FIG. 2, the communication control module 170 may include a signal determination module 210 and a signal control module 220.

The signal determination module 210 may designate (or select) at least one of a first communication module (for example, the communication interface 160) of the first electronic device and a second communication module of the second electronic device for communication with the third electronic device. The signal determination module 210 may determine which one of the first and second communication modules will receive a first message. The first message may be an internal message of the electronic device including a signal for providing a call service, a message service, a multimedia service, or the like. The first message may include receiver information (for example, a phone number of the third electronic device or an identification for identifying the third electronic device) and/or sender information (for example, a phone number of the first electronic device or an identification for identifying the first electronic device).

The signal determination module 210 may determine which one of the first and second communication modules will receive the first message by using communication related information. The communication related information may include at least one of setting information of the first electronic device, a type of communication signal, a location or a type of Subscriber Identity Module (SIM), a connection state with an external electronic device, a user input, a power state, a charging state, a network state, and a phone plan.

When the first communication module is designated, the signal determination module 210 may transmit the first message to the first communication module. The first communication module may communicate with the third electronic device by using at least some of information included in the first message.

When the second communication module is designated, the signal determination module 210 may transmit the first message to the signal control module 220. The signal control module 220 may re-configure the first message and transmit the re-configured first message to the first communication module, and the first communication module may transmit the re-configured message to the second electronic device. Re-configuring the first message may include converting the first message into a message having a configuration (for example, a format, type, protocol, or the like) which can be analyzed by the second communication module.

The signal control module 220 may receive the first message from the signal determination module 210 and determine a connection scheme between the first and second electronic devices. The signal control module 220 may generate a second message by at least partially re-configuring the first message as a configuration which can be analyzed by the second communication module and correspond to the determined connection scheme. The signal control module 220 may transmit the second message to the first communication module. The first communication module may transmit the second message to the second electronic device. For example, the connection scheme may be a short-range connection scheme, such as BT, WiFi, BLE, NFC, ZigBee, or the like. Alternatively, the connection scheme may be, for example, a long-range connection scheme using a Session Traversal Utilities for Network address translator (STUN) server.

The second message may include a header and a payload. The payload may have a configuration (for example, a format, type, protocol, or the like) which can be analyzed by the first communication module and/or the second communication module, and the configuration may be an Attention Command (AC), InterProcess Communication (IPC), a Qualcomm Mobile Station Modem (MSM) Interface (QMI), a Session Initiation Protocol (SIP), and/or the like. The header may include a sequence number, Cyclic Redundancy Check (CRC) data, a reference ID, and/or the like for routing or data management in a server/client structure.

Figure 3:
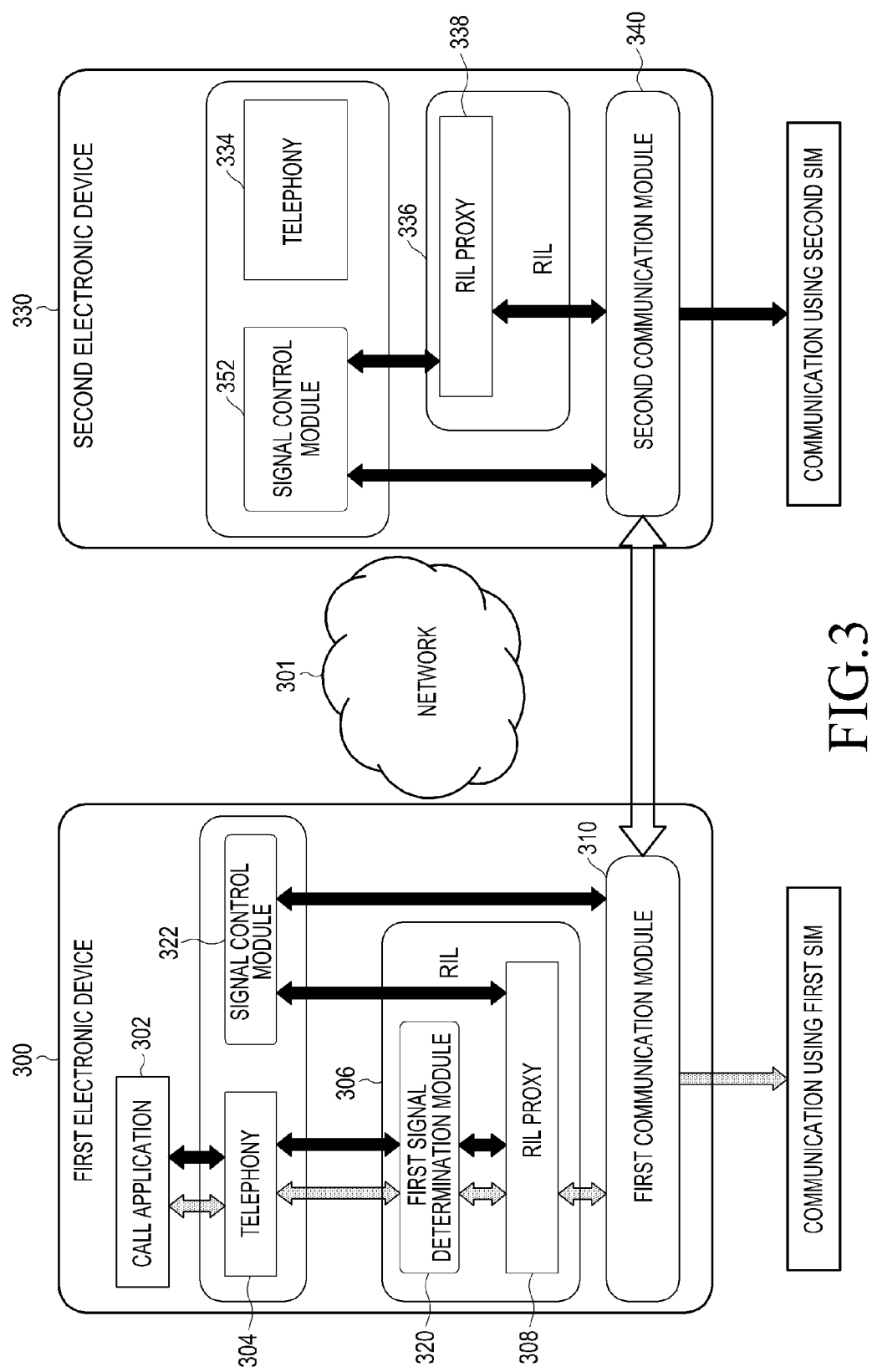
FIG. 3 is a view describing a communication method according to an embodiment of the present disclosure.

FIG. 3 is a view describing a communication method according to an embodiment of the present disclosure.

Referring to FIG. 3, a first electronic device 300 may include a first call application 302, a first telephony 304, a first Radio Interface Layer (RIL) 306, a first RIL proxy 308, a first communication module 310, a first signal determination module 320, and a first signal control module 322.

The first call application 302 may provide an application screen to the user and receive an input related to communication from the user by using the application screen.

The first telephony 304 may generate a first message according to a user input. The first message may have a configuration (for example, a format, type, protocol, or the like) which can be analyzed by the first communication module 310, and the configuration may be an AC, an IPC, a QMI, an SIP, and/or the like. The first message may include receiver information (for example, a phone number). The first RIL 306 may provide an interface between the first telephony 304 or the first signal control module 322 and the first communication module 310. The first RIL 306 may include a first RIL driver for processing a command and an event related to a call and a first RIL proxy 308 for processing or managing a request of the first telephony 304 or the first signal control module 322 for the first RIL driver.

The first communication module 310 may perform transmission/reception of data, signals, or messages through a network 301, a connection with a second electronic device 330, and/or the like.

The first signal determination module 320 may designate or select at least one of the first communication module 310 of the first electronic device 300 and a second communication module 340 of the second electronic device 330 for communication with the third electronic device.

The first signal control module 322 may generate a second message related to the first message and transmit the second message to the second electronic device 330 by using the first communication module 310.

The second electronic device 330 may include a second telephony 334, a second RIL 336, a second RIL proxy 338, a second communication module 340, and a second signal control module 352. Although not illustrated, the second electronic device 330 may further include a second call application performing an equal/similar function to that of the first call application 302 and a second signal determination module for performing an equal/similar function to that of the first signal determination module 320. The second telephony 334 may perform an equal/similar function to that of the first telephony 304.

The second RIL 336 may provide an interface between the second telephony 334 or the first signal control module 322 and the second communication module 340. The second RIL 336 may include a second RIL driver for processing a command and an event related to a call and a second RIL proxy 338 for processing or managing a request of the second telephony 334 or the second signal control module for the second RIL driver.

The second communication module 340 may perform transmission/reception of data, signals, or messages through the network 301, a connection with the first electronic device 300, and/or the like.

The second signal control module may receive the second message from the first electronic device 300 by using the second communication module 340 and obtain the first message by using at least some of the information included in the second message. The second communication module 340 may communicate with a third electronic device by using at least some of the information included in the first message. The second signal control module may transmit the first message to the second communication module 340 to allow the second communication module 340 to communicate with the third electronic device.

A process may be performed in which the user communicates with the third electronic device by using at least some of the information included in the first message containing a contact number of the first electronic device 300 stored in the first SIM of the first electronic device 300 as sender information.

The first call application 302 may receive user input information by using an application screen and transmit the user input information to the first telephony 304. The first telephony 304 may generate a first message by using the user input information and transmit the first message to the first signal determination module 320. The first signal determination module 320 may designate the first communication module 310 from the first and second communication modules 310 and 340 by using the user input information or communication related information and transmit the first message to the first RIL proxy 308. The first signal determination module 320 may insert information indicating the designation of the first communication module 310 into the first message or transmit the information to the first RIL proxy 308. The first RIL proxy 308 may transmit the first message to the first communication module 310. The first communication module 310 may communicate with the third electronic device through the network 301 (for example, a cellular communication network) by using at least some of the information included in the first message containing a contact number of the first electronic device 300 stored in the first SIM of the first electronic device 300 as sender information. For example, the user may call the third electronic device or transmit a message to the third electronic device while configuring the contact number of the first electronic device 300 stored in the first SIM of the first electronic device 300 as a sender.

A process may be performed in which the user communicates with the third electronic device by using at least some of the information included in the first message containing a contact number of the second electronic device 330 stored in the second SIM of the second electronic device 330 as sender information.

The first call application 302 may receive user input information by using an application screen and transmit the user input information to the first telephony 304. The first telephony 304 may generate a first message by using the user input information and transmit the first message to the first signal determination module 320. The first signal determination module 320 may designate the second communication module 340 from the first and second communication modules 310 and 340 by using the user input information or communication related information and transmit the first message to the first RIL proxy 308. The first signal determination module 320 may insert information indicating the designation of the second communication module 340 into the first message or transmit the information to the first RIL proxy 308. The first RIL proxy 308 may transmit the first message to the first signal control module 322. The first signal control module 322 may determine a connection scheme between the first and second electronic devices 300 and 330 for communication with the second electronic device 330. The first signal control module 322 may generate a second message related to the first message (or a re-configured first message) by at least partially re-configuring the first message to have a configuration which can be analyzed by the second communication module 340 and correspond to the determined connection scheme. The first signal control module 322 may transmit the second message to the first communication module 310. The first communication module 310 may transmit the second message to the second electronic device 330 through the network (for example, using BT, WiFi, BLE, NFC, ZigBee, or the like).

According to an embodiment, the first signal control module 322 may determine whether the first and second communication modules 310 and 340 are connected to each other. When the first and second communication modules 310 and 340 are not connected to each other, the first signal control module 322 may establish a connection with the second communication module 340 by controlling the first communication module 310 (for example, by transmitting a connection request message) and then transmit the second message to the second electronic device 330 by using the first communication module 310.

According to an embodiment, the first electronic device 300 may perform a connection process with the second electronic device 330, and the first electronic device 300 may receive a message configuration information supported by the second electronic device 300 or exchange own message configuration information. The first signal control module 322 may at least partially re-configure the first message according to the received message configuration information.

According to an embodiment, the first and second electronic devices 330 may set a particular message configuration for communication therebetween and the first signal control module 322 may at least partially re-configure the first message according to the set message configuration information.

According to an embodiment, the user may configure an environment setting such that the second communication module 340 is used for a particular contact number.

According to an embodiment, when the connection with the second electronic device 330 is released, the first electronic device 300 may make a request for the connection to the second electronic device 330. When a connection of a first scheme (for example, BT) with the second electronic device is released, the first electronic device 300 may attempt connections using other schemes (for example, WiFi) according to a configured priority.

According to an embodiment, when a call connection of the first electronic device 300 fails, the call connection may be attempted using the second electronic device 330.

The second communication module 340 of the second electronic device 330 may receive the second message from the first electronic device 300. The second communication module 340 may transmit the second message to the second control module 352. The second signal control module 352 may obtain the first message by using at least some of the information included in the second message. The second signal control module 352 may determine a configuration of the first message. The second signal control module 352 may at least partially re-configure the first message to have a configuration which can be analyzed by the second communication module 340. For example, when the configuration of the first message corresponds to an AT command and a configuration which can be analyzed by the second communication module 340 corresponds to IPC, the second signal control module 352 may re-configure the first message to have the IPC configuration. The second signal control module 352 may transmit the re-configured first message or the obtained first message to the second RIL proxy 338. The second RIL proxy 338 may transmit the first message to the second communication module 340. The second communication module 340 may communicate with the third electronic device through the network (for example, a cellular communication network) by using at least some of the information included in the first message containing a contact number of the second electronic device 330 stored in the second SIM of the second electronic device 330 as sender information. For example, the user may call the third electronic device or transmit a message to the third electronic device while configuring the contact number of the second electronic device 330 stored in the second SIM of the second electronic device 330 as a sender.

According to an embodiment, the second signal control module 352 may transmit the re-configured first message or the obtained first message to the second communication module 340 without the use of the second RIL proxy 338.

According to an embodiment, when the second electronic device 330 is connected with the first electronic device 300 through BT, the second electronic device 330 may partially or completely (or entirely) turn off a cellular communication part of the second communication module 340.

According to an embodiment, when the connection between the first electronic device 300 and the second electronic device 330 is released for a preset time or longer, one of the first electronic device 300 and the second electronic device 330 may automatically configure call forwarding to the other of the first electronic device 300 and the second electronic device 330 in a service provider communication network.

According to an embodiment, the first electronic device 300 or the second electronic device 330 may transmit a response message to a recently received contact number or to a contact number according to a user's selection.

Figure 4:
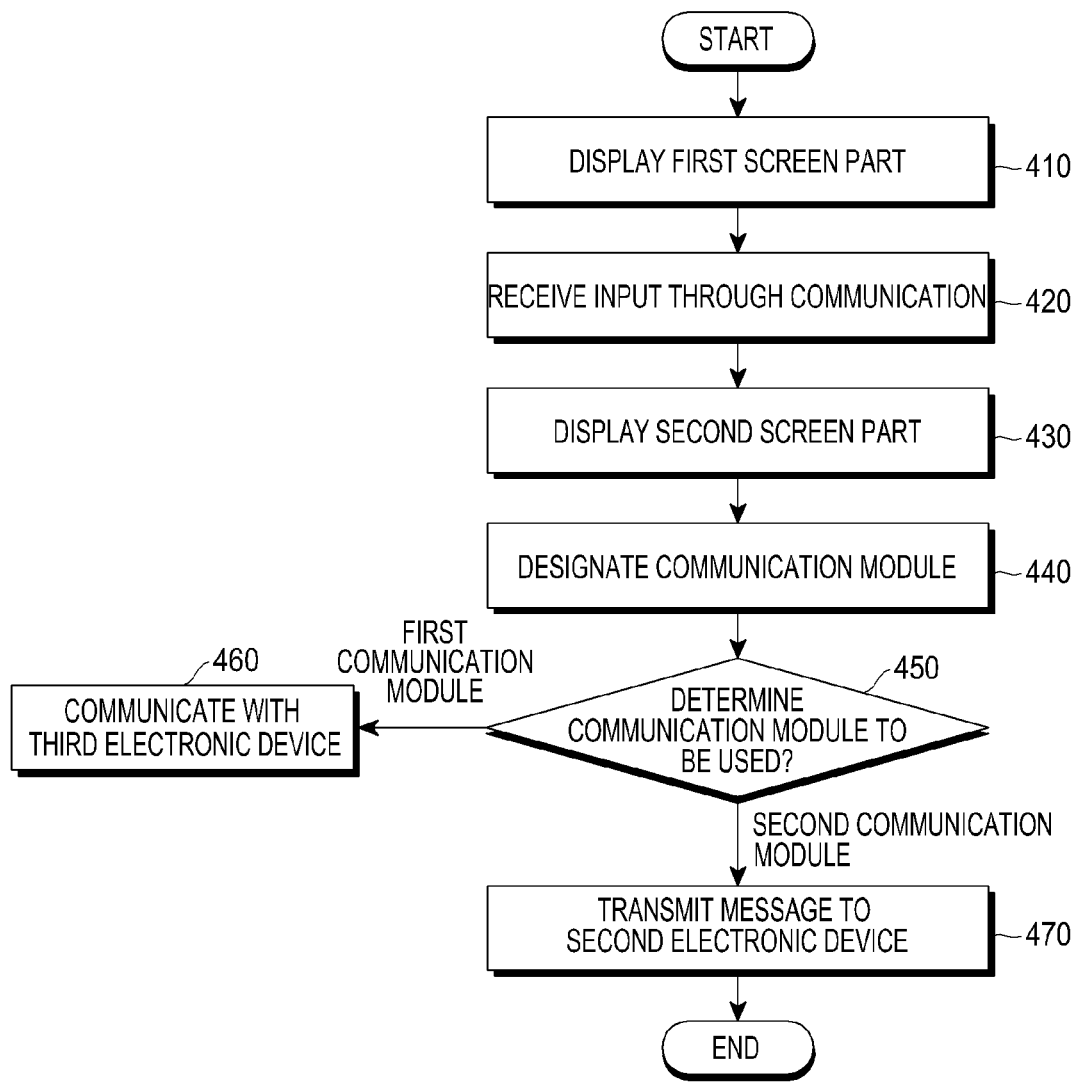
FIG. 4 is a flowchart illustrating a communication method of a first electronic device according to an embodiment of the present disclosure.

FIG. 4 is a flowchart illustrating a communication method of the first electronic device according to an embodiment of the present disclosure.

Referring to FIG. 4, a process is depicted in which the user designates one of the first communication module of the first electronic device and the second communication module of the second electronic device and communicates with the third electronic device by using the designated communication module.

In operation 410, a first screen part for receiving an input for communication is displayed on a display of the first electronic device. The first screen part may be the entirety or part of an application screen. When the user executes a particular application, the application screen may be a screen (for example, a window) displayed on the display of the electronic device. For example, the first screen part may be a text (for example, a selectable text) or an image (for example, an icon) included in the application screen.

The application may be an application requiring communication with the third electronic device, and may include, for example, a phone application, a text application, a voice recognition application, a schedule management application, a document writing application, a music application, an Internet application, a map application, a camera application, an email application, an image editing application, a search application, a file search application, a video application, a game application, a Social Networking Service (SNS), a message application, a writing input application, a character input application (or a keyboard/keypad application), a cursor application, a streaming application, a mirroring application, and/or the like.

In operation 420, a user input for the first screen part may be received. The user may order communication with the third electronic device by using the first screen part (for example, by selecting the first screen part through a touch or hovering).

In operation 430, a second screen part for designating at least one of the first and second communication modules may be displayed. The second screen part may be text (for example, a selectable text) or an image (for example, an icon) included in the application screen or may be a screen separated from the application screen. For example, a message, a notification window or the like for designating at least one of the first and second communication modules may be displayed above the application screen. The second screen part may include a first item (for example, a first button) for designating the first communication module and a second item (for example, a second button) for designating the second communication module. The second screen part may include a first identification (for example, a mobile phone, a first SIM, a first phone number or the like) corresponding to the first communication module and a second identification (for example, a watch, a second SIM, a second phone number or the like) corresponding to the second electronic device. Each of the first and second identifications may be displayed by a contact number, a phone number, a name of a device or module (for example, the first or second SIM), a configured text, or a configured icon.

In operation 440, a user input may be received by the second screen part. The user may designate at least one of the first and second communication modules by using the second screen part (for example, by selecting the second screen part through a touch or hovering).

In operation 450, a communication module to be used for the communication with the third electronic device may be determined. In response to the user input for the second screen part, the first electronic device may determine a communication module to be used for the communication with the third electronic device from the first and second communication modules.

In operation 460, when the first communication module is determined as the communication module to be used for communication with the third electronic device, the first electronic device may communicate with the third electronic device by using the first communication module. A message for the communication with the third electronic device may include information on signals for performing a call service, a message service, a multimedia service, or the like.

In operation 470, when the second communication module is determined as the communication module to be used for the communication with the third electronic device, the first electronic device may transmit a message to the second electronic device using the first communication module. The message transmitted to the second electronic device may be a message (or a second message related to the first message) generated by re-configuring the first message having a configuration which can be analyzed by the first communication module such that the message can be analyzed by the second communication module and correspond to a connection scheme between the first and second electronic devices. The first message may include receiver information (for example, a phone number).

Figure 5:
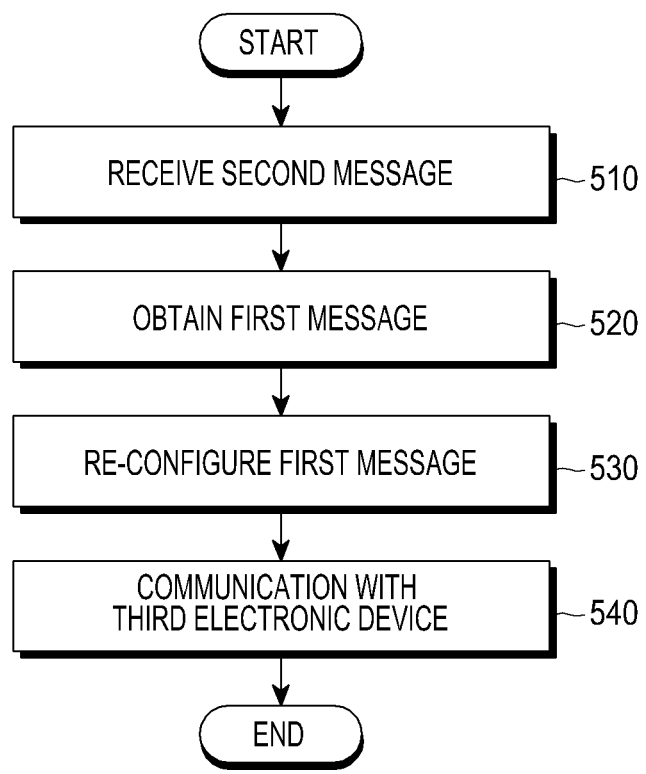
FIG. 5 is a flowchart illustrating a communication method of a second electronic device according to an embodiment of the present disclosure.

FIG. 5 is a flowchart illustrating a communication method of the second electronic device according to an embodiment of the present disclosure.

In operation 510, the second electronic device may receive a second message from the first electronic device.

In operation 520, the second electronic device may obtain a first message by using at least some of the information included in the second message. The first message may have a configuration which can be analyzed by the first communication module of the first electronic device and the second message may be a message generated by at least partially re-configuring the first message to have a configuration which can be analyzed by the second communication module of the second electronic device and correspond to a connection scheme between the first and second electronic devices.

In operation 530, the second electronic device may at least partially re-configure the first message such that the first message has the configuration which can be analyzed by the second communication module.

In operation 540, the second electronic device may communicate with the third electronic device by using at least some of the information included in the re-configured first message having the configuration which can be analyzed by the second communication module through the second communication module.

FIGS. 6A and 6B and FIGS. 7A and 7B are views describing a communication method according to various embodiments of the present disclosure.

Figures 6A, 6B:
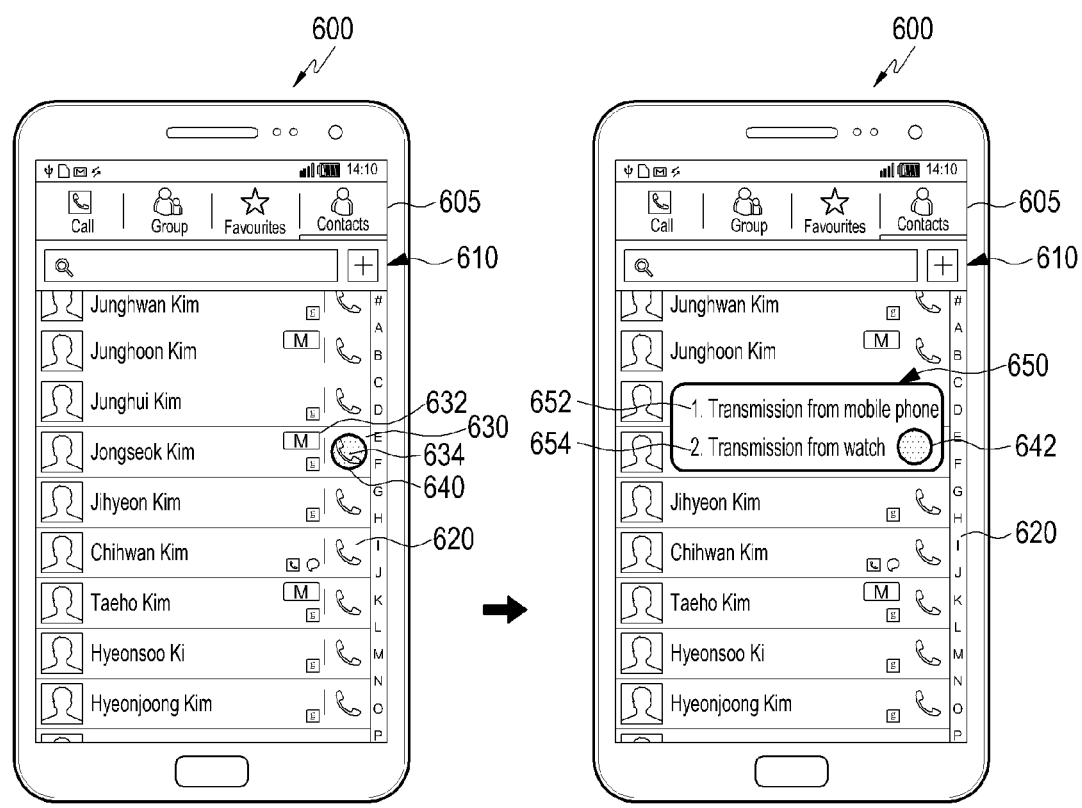
FIGS. 6A and 6B and FIGS. 7A and 7B are views describing a communication method according to various embodiments of the present disclosure.

Referring to FIG. 6A, a contact information screen 610 of a call application is displayed on a display 605 of a first electronic device 600. The contact information screen 610 may include a plurality of contact numbers, and the plurality of contact numbers may include at least one contact number 630 stored in a second electronic device. The plurality of contact numbers may include contact numbers 620 registered by the first electronic device 600 and contact numbers 630 registered by the second electronic device. For example, the first electronic device 600 may receive contact information from the second electronic device and store the received contact information in a memory of the first electronic device 600. The contact numbers 630 registered by the second electronic device may be indicated to be distinguished from the contact numbers 620 registered by the first electronic device 600. Such an indication may include a visual emphasis, auditory emphasis, a tactile emphasis, or the like. For example, the visual emphasis may be implemented by displaying an icon, an image, a text, or the like or making a color, a form, a transparency, a location, or the like of the contact number registered by the second electronic device different from that of the contact number registered by the first electronic device 600. For example, the auditory emphasis may be implemented by outputting a voice (for example, audio guidance) or a sound (for example, notification sound) when the user selects the contact number registered by the second electronic device. For example, the tactile emphasis may be implemented by giving a vibration when the user selects the contact number registered by the second electronic device. In the present example, the contact number registered by the second electronic device may be emphasized by an icon 'M' 632.

According to an embodiment, when a connection between the first and second electronic devices is released, contact numbers registered by the second electronic device may be inactivated or hidden.

A first screen part 634 for receiving an input for communication may correspond to the entirety or part of the contact information screen 610. For example, the first screen part 634 may be a call icon.

When the user selects the first screen part 634 of the contact number 630 registered by the second electronic device in the contact information screen 610 illustrated in FIG. 6A, a second screen part 650 for designating at least one of the first and second communication modules may be displayed as illustrated in FIG. 6B. The second screen part 650 may include a first identification (for example, a mobile phone) corresponding to the first communication module and a second identification (for example, a watch) corresponding to the second electronic device. Each of the first and second identifications may be displayed by a contact number, a phone number, a name of the device or module, a configured text, or a configured icon. The second screen part 650 may include a selectable first item 652 including the first identification (for example, mobile phone) and a selectable second item 654 including the second identification (for example, watch). The user may designate a desired communication module by selecting one of the first and second items. For example, the user may call the third electronic device or transmit a message to the third electronic device while having the contact number of the second electronic device as a sender, by selecting the second item 654.

Figures 7A, 7B:
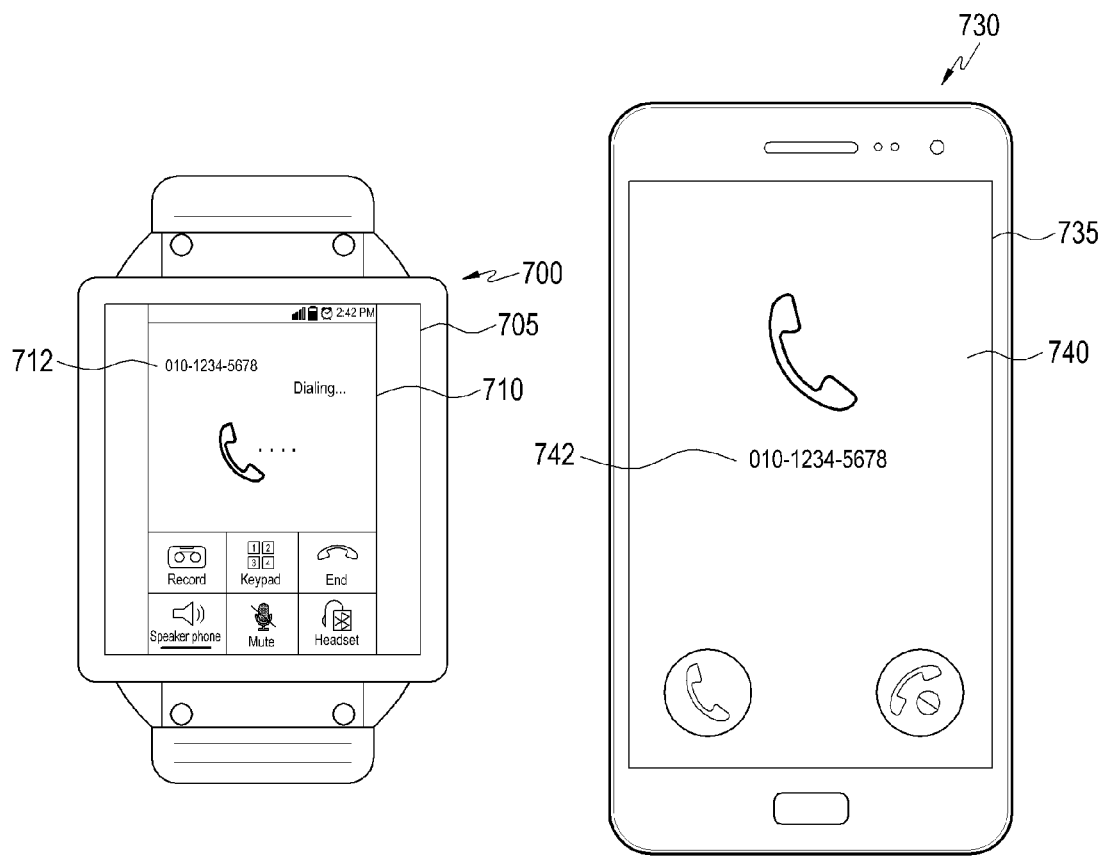

Referring to FIG. 7A, an origination screen 710 of a call application is displayed on a display 705 of a second electronic device 700 and a contact number 712 of the third electronic device (for example, a phone number 101-1234-5678 of the third electronic device) may be displayed on the origination screen 710.

Referring to FIG. 7B, a reception screen 740 of a call application is displayed on a display 735 of a second electronic device 730 and a contact number 742 of the third electronic device (for example, a phone number 010-1234-5678 of the third electronic device) may be displayed on the reception screen 740.

Figure 8:
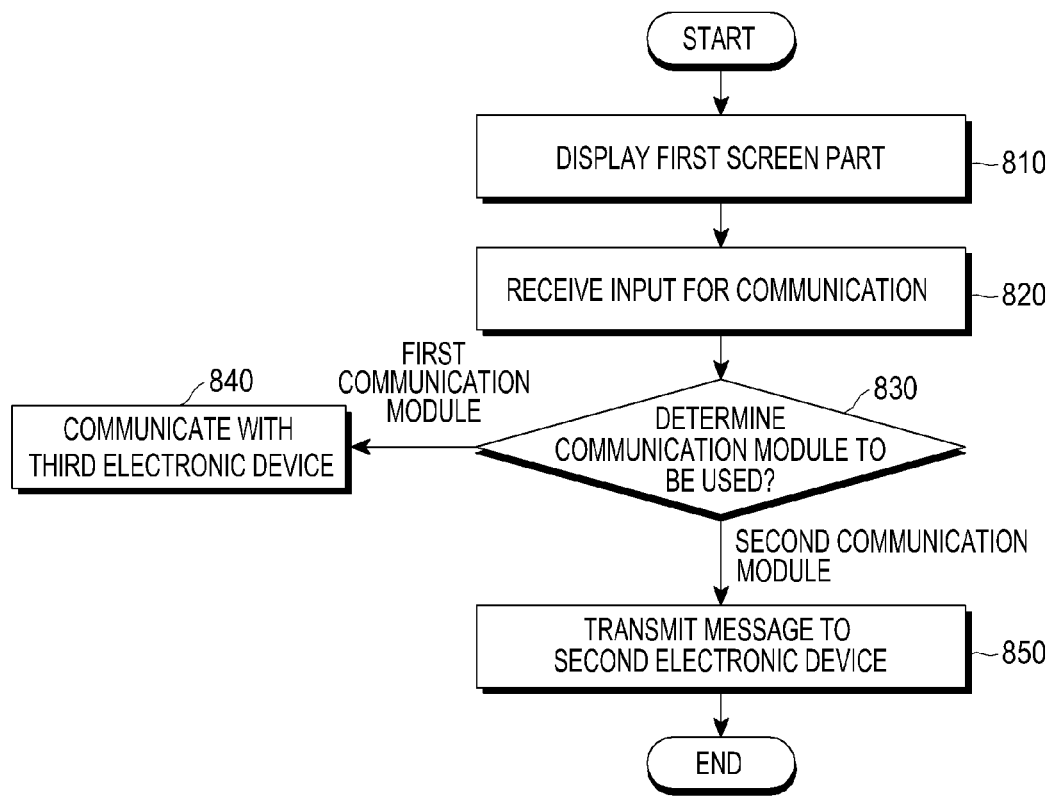
FIG. 8 is a flowchart illustrating a communication method of a first electronic device according to an embodiment of the present disclosure.

FIG. 8 is a flowchart illustrating a communication method of the first electronic device according to an embodiment of the present disclosure.

Referring to FIG. 8, a process is depicted in which the first electronic device designates one of the first communication module of the first electronic device and the second communication module of the second electronic device and communicates with the third electronic device by using the designated communication module.

In operation 810, a first screen part for receiving an input for communication is displayed on a display of the first electronic device. The first screen part may be the entirety or part of an application screen. When the user executes a particular application, the application screen may be a screen (for example, a window) displayed on the display of the electronic device. For example, the first screen part may be a text (for example, a selectable text) or an image (for example, an icon) included in the application screen.

In operation 820, a user input for the first screen part may be received. The user may instruct communication with the third electronic device by using the first screen part (for example, by selecting the first screen part through a touch or hovering).

In operation 830, a communication module to be used for the communication with the third electronic device may be determined. The first electronic device may determine which one of the first and second communication modules will be used based on communication related information. The communication related information may include at least one of setting information of the first electronic device, the type of communication signal, a location or a type of SIM, a connection state with an external electronic device, a user input, a power state, a charging state, a network state, and a phone plan. For example, the first electronic device may determine to use the second communication module in a case where the user selects the contact number registered by the second electronic device, a case where the user selects a contact number included in a call log of the second electronic device, a case where the second communication module is set to be used for a particular contact number, or a case where a communication history of using (only) the second communication module for a particular contact number exists.

In operation 840, when the first communication module is determined as the communication module to be used for the communication with the third electronic device, the first electronic device may communicate with the third electronic device using the first communication module. A message for the communication with the third electronic device may include a signal for performing a call service, a message service, a multimedia service or the like.

In operation 850, when the second communication module is determined as the communication module to be used for the communication with the third electronic device, the first electronic device may transmit a message to the second electronic device using the first communication module. The message transmitted to the second electronic device may be a message (or a second message related to the first message) generated by re-configuring the first message having a configuration which can be analyzed by the first communication module such that the message can be analyzed by the second communication module.

Figures 9A, 9B:
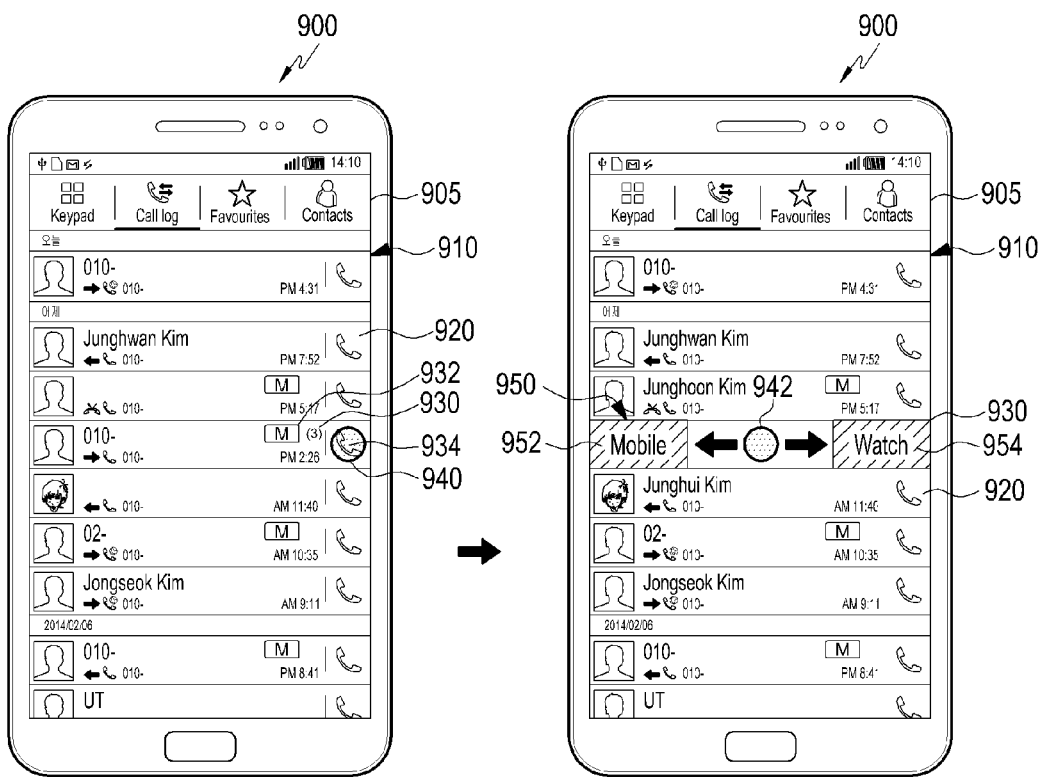
FIGS. 9A and 9B are views describing a communication method according to various embodiments of the present disclosure.

FIGS. 9A and 9B are views describing a communication method according to an embodiment of the present disclosure.

Referring to FIG. 9A, a call log screen 910 of a call application is displayed on a display 905 of a first electronic device 900. The call log screen 910 includes a plurality of items, and the plurality of items may include termination/origination call log items 920 of the first electronic device and termination/origination call log items 930 of the second electronic device. For example, the first electronic device 900 may receive call log information from the second electronic device and store the received call log information in a memory of the first electronic device 900. The call log items 930 of the second electronic device may be emphasized. Such an emphasis may include a visual emphasis, auditory emphasis, a tactile emphasis, or the like. For example, the visual emphasis may be implemented by displaying an icon, an image, text or the like or making a color, a form, a transparency, a location, or the like of the call log item 930 of the second electronic device different from that of the call log item 920 of the first electronic device. In the present example, the call log item 930 of the second electronic device may be emphasized by an icon 'M' 932.

According to an embodiment, when a connection between the first and second electronic devices is released, the termination/origination call log items 930 of the second electronic device may be inactivated or hidden.

A first screen part 934 for receiving an input for communication may correspond to the entirety or part of the call log screen 910. For example, the first screen part 934 may be a call icon.

When the user selects the first screen part 934 of the call log item 930 of the second electronic device in the call log screen 910 illustrated in FIG. 9A, the user may call the third electronic device or transmit a message to the third electronic device while having the contact number of the second electronic device as a sender.

Referring to FIG. 9B, when the user selects the call log item 930 of the second electronic device (corresponding to the first screen part for receiving the input for communication with the third electronic device in the present example), a second screen part 950 for designating at least one of the first and second communication modules may be displayed. The second screen part 950 may include a first identification 952 (for example, a mobile phone) corresponding to the first communication module and a second identification 954 (for example, a watch) corresponding to the second electronic device. The user may designate a desired communication module through a sliding gesture (or a swipe gesture). For example, the user may designate the first communication module by taking a left sliding gesture and designate the second communication module by taking a right sliding gesture. When the user designates the second communication module, the first electronic device 900 may call the third electronic device or transmit a message to the third electronic device while using the contact number of the second electronic device as a sender.

In various embodiments of the present disclosure, the second screen part may be displayed on the same application screen together with the first screen part, displayed separately from the first screen part, or displayed after the first screen part is displayed.

Figure 10:
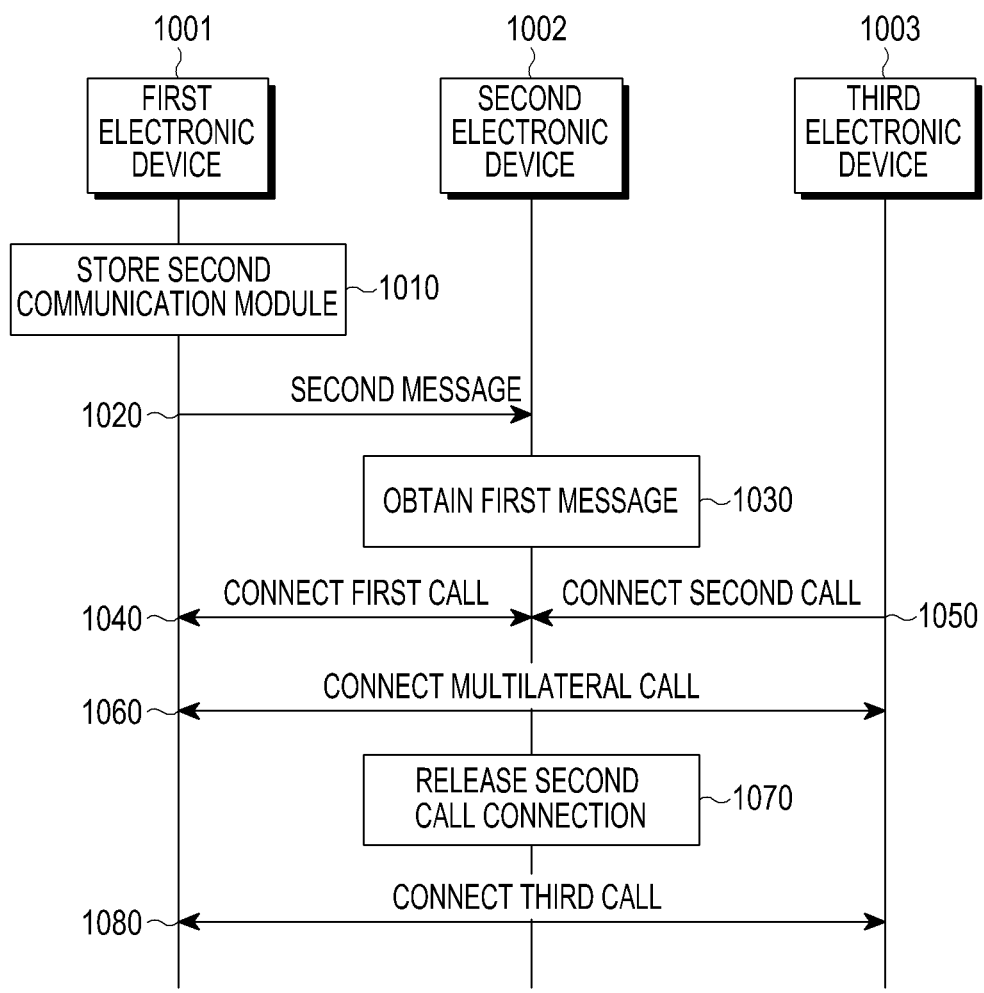
FIG. 10 is a flowchart illustrating a communication method according to an embodiment of the present disclosure.

FIG. 10 is a flowchart illustrating a communication method according to an embodiment of the present disclosure.

In operation 1010, from a first communication module of a first electronic device 1001 and a second communication module of a second electronic device 1002, the first electronic device 1001 may designate the second communication module of the second electronic device 1002 as a communication module for communication with a third electronic device 1003 using communication related information.

In operation 1020, the first electronic device 1001 may transmit a second message to the second electronic device 1002. The second message may be a message generated by re-configuring the first message to have a configuration which can be analyzed by the second communication module of the second electronic device 1002 and correspond to a connection scheme between the first and second electronic devices 1001 and 1002. The first message may have a configuration which can be analyzed by the first communication module of the first electronic device 1001. The first message may include receiver information (for example, a phone number of the third electronic device 1003) and/or sender information (for example, a phone number of the first electronic device 1001).

In operation 1030, the second electronic device 1002 may obtain the first message by using at least some of the information included in the second message.

In operation 1040, the first electronic device 1001 may establish a first call connection with the second electronic device 1002.

In operation 1050, the second electronic device 1002 may establish a second call connection with the third electronic device 1003 by using the receiver information of the first message in a state where the first call connection with the first electronic device 1001 is maintained. According to an embodiment, the second electronic device 1002 may establish the first call connection before or after the establishment of the second call connection. According to an embodiment, the second electronic device 1002 may simultaneously establish the first and second call connections.

In operation 1060, as the first and second call connections are sequentially or simultaneously established, a multilateral call connection may be established among the first to third electronic devices 1001, 1002, and 1003.

In operation 1070, the second electronic device 1002 may release the second call connection.

In operation 1080, as the second call connection is released from the multilateral call connection, only a third call connection between the first and third electronic device 1001 and 1003 may be maintained. The first and third electronic device 1001 and 1003 may perform a call or data communication through the third call connection.

Figure 11:
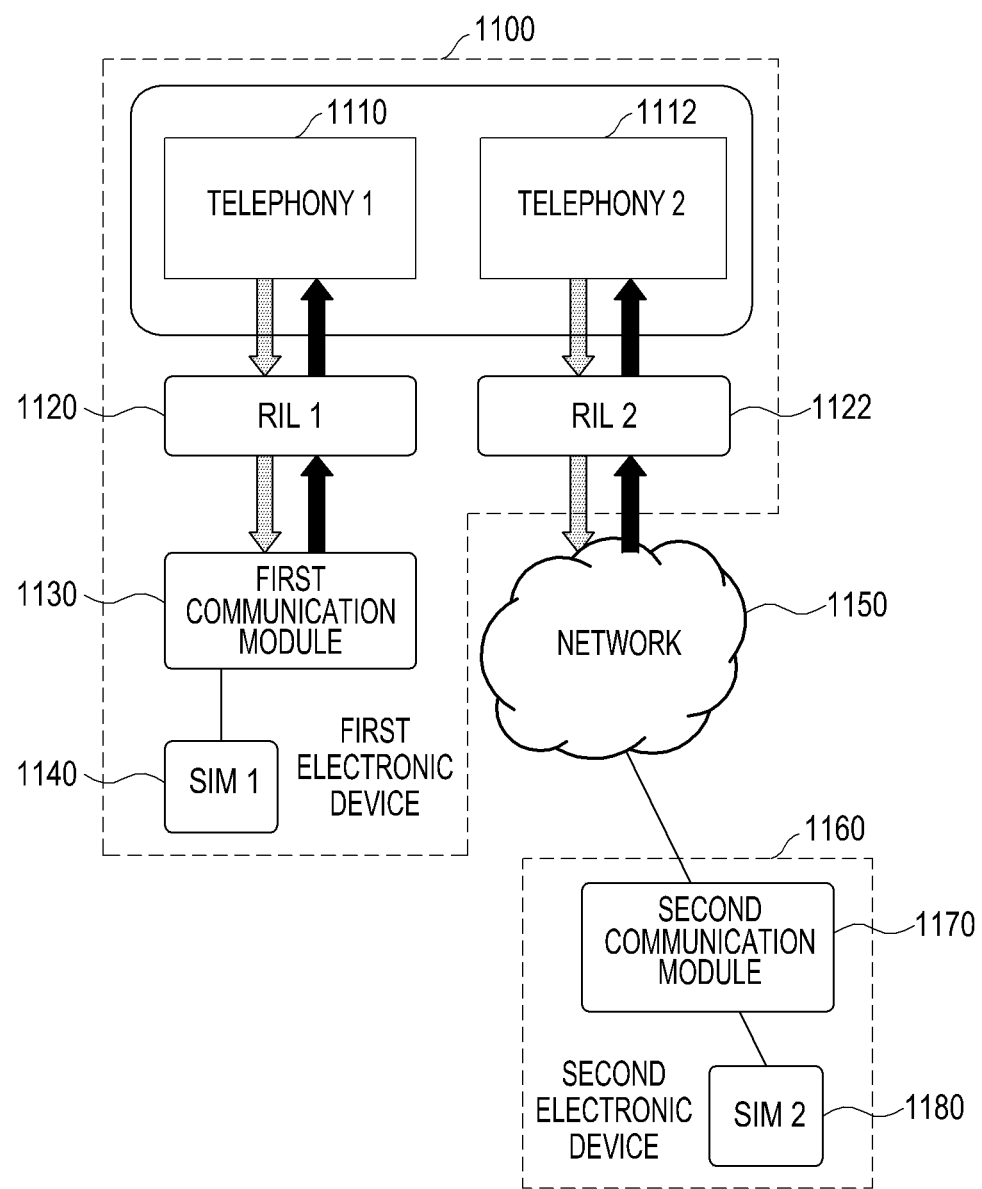
FIGS. 11 and 12 are views describing a communication method according to various embodiments of the present disclosure.

FIG. 11 is a view describing a communication method according to an embodiment of the present disclosure.

Referring to FIG. 11, a first electronic device 1100 may include a first telephony 1110, a second telephony 1112, a first RIL 1120, a second RIL 1122, a first communication module 1130, and a first SIM 1140. A second electronic device 1160 may include a second communication module 1170 and a second SIM 1180.

The first telephony 1110 may generate a first message according to a user input. The first RIL 1120 may provide an interface between the first telephony 1110 and a first communication module 1130. The first communication module 1130 may communicate with a third electronic device through a network 1150 (for example, a cellular communication network) using at least some of the information included in the first message containing a contact number of the first electronic device 1100 stored in the second SIM 1140 as sender information.

The second telephony 1112 may generate a second message according to a user input. The second RIL 1122 may provide an interface between the second telephone 1112 and the second communication module 1170 through the network (for example, using BT, WiFi, BLE, NFC, ZigBee, or the like). The second communication module 1170 may communicate with the third electronic device through the network (for example, a cellular communication network) using at least some of the information included in the second message containing a contact number of the second electronic device 1160 stored in the second SIM 1180 as sender information.

The first electronic device 110 may configure the first SIM 1140 as a physical SIM and configure the second SIM 1180 of the second electronic device 1160 as a remote or logical SIM.

Figure 12:
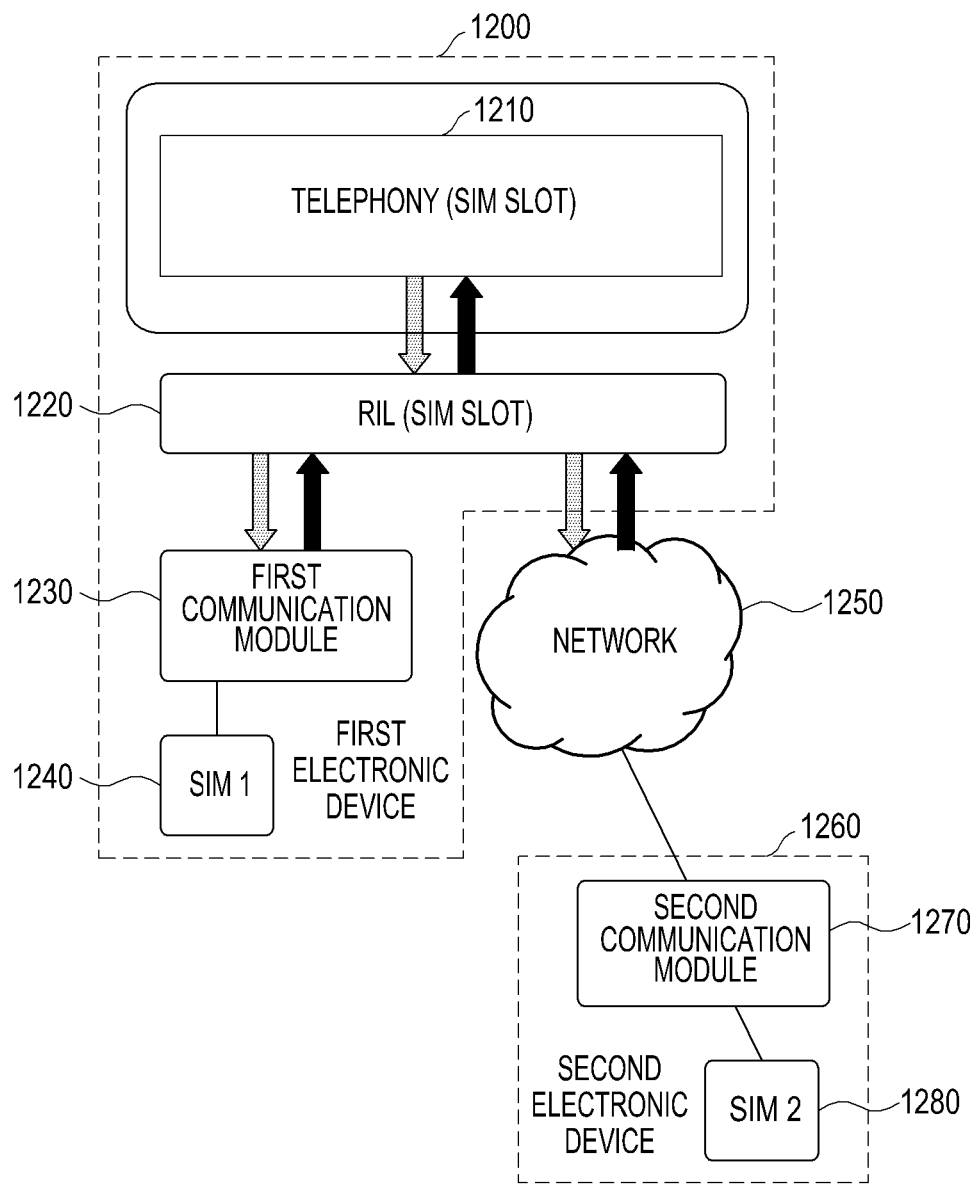

FIG. 12 is a view describing a communication method according to an embodiment of the present disclosure.

Referring to FIG. 12, a first electronic device 1200 may include a telephony 1210, an RIL 1220, a first communication module 1230, and a first SIM 1240. A second electronic device 1260 may include a second communication module 1270 and a second SIM 1280.

The telephony 1210 may include first and second SIM slots for the first and second SIMs 1240 and 1280 and generate a first message according to a user input by using the first SIM 1240. The RIL 1220 may include the first and second SIM slots for the first and second SIMs 1240 and 1280 and provide an interface between the telephony 1210 for the first SIM 1240 and the first communication module 1230. The first communication module 1230 may communicate with a third electronic device through a network 1250 (for example, a cellular communication network) using at least some of the information included in the first message containing a contact number of the first electronic device 1200 stored in the first SIM 1240 as sender information.

The telephony 1210 may generate a second message according to a user input by using the second SIM 1280. The RIL 1220 may provide an interface between the telephony 1210 for the second SIM 1280 and the second communication module 1230 through the network (for example, using BT, WiFi, BLE, NFC, ZigBee, or the like). The second communication module 1270 may communicate with the third electronic device through the network 1250 (for example, a cellular communication network) using at least some of the information included in the second message containing a contact number of the second electronic device 1260 stored in the second SIM 1280 as sender information.

The first electronic device 1200 may configure the first SIM 1240 as a physical SIM and configure the second SIM 1280 of the second electronic device 1260 as a remote or logical SIM.

Figure 13:
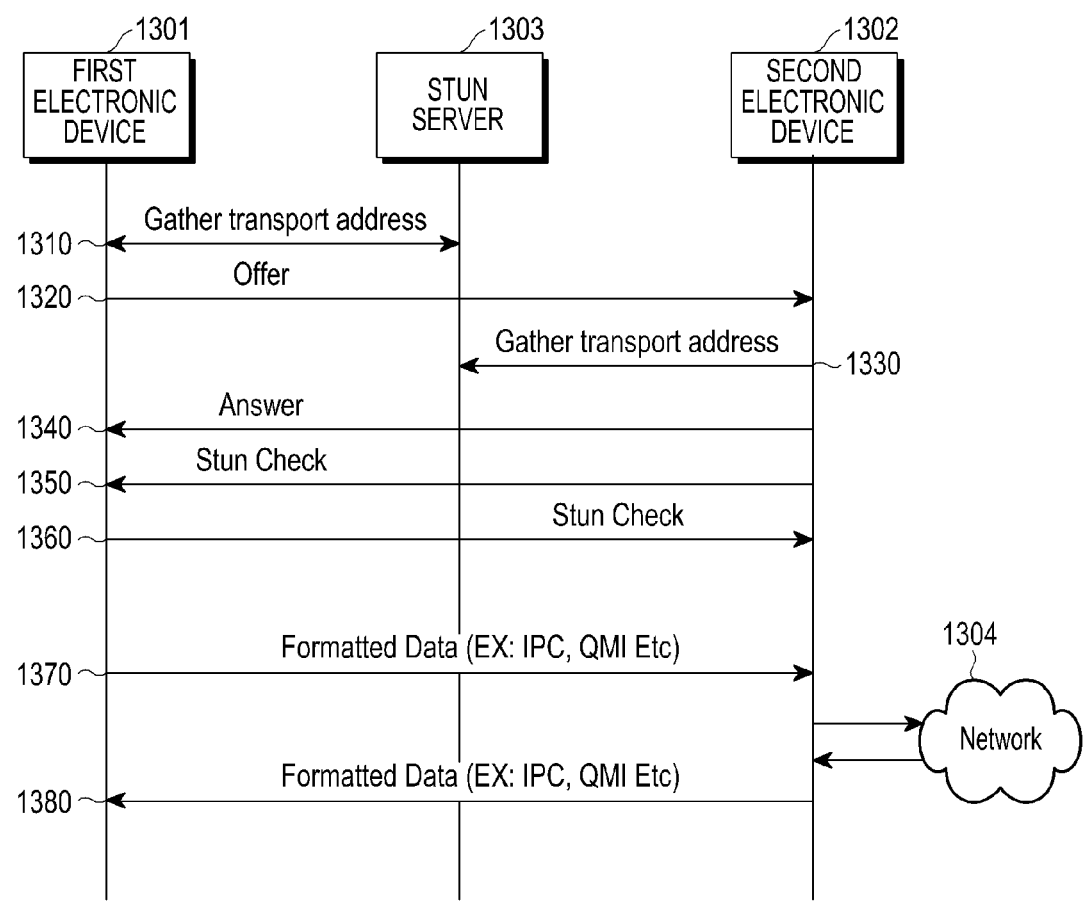
FIGS. 13, 14, 15, and 16 illustrate communication connection methods according to various embodiments of the present disclosure.

FIG. 13 illustrates a communication connection method according to an embodiment of the present disclosure.

In operation 1310, a first electronic device 1301 may make a request for an Internet Protocol (IP) address and information on a port to a STUN server 1303 and receive the IP address and the information on the port from the STUN server 1303.

In operation 1320, the first electronic device 1301 may transmit an offer signal for a connection to a second electronic device 1302.

In operation 1330, the second electronic device 1302 may make a request for an IP address and information on a port to the STUN server 1303 and receive the IP address and the information on the port from the STUN server 1303.

In operation 1340, the second electronic device 1302 may transmit an answer signal in response to the offer signal.

In operation 1350, the second electronic device 1302 may transmit a STUN check signal for identifying the connection to the first electronic device 1301.

In operation 1360, the first electronic device 1301 may transmit the STUN check signal for identifying the connection to the second electronic device 1302.

In operation 1370, the first electronic device 1301 may transmit data or a message having a configuration (for example, a format, a form, a protocol or the like) which can be analyzed by the first communication module of the first electronic device 1301 and/or the second communication module of the second electronic device 1302 to the second electronic device 1302 through a network 1304.

In operation 1380, the second electronic device 1302 may transmit data or a message having a configuration (for example, a format, a form, a protocol or the like) which can be analyzed by the first communication module of the first electronic device 1301 and/or the second communication module of the second electronic device 1302 to the first electronic device 1301 through the network 1304.

Figure 14:
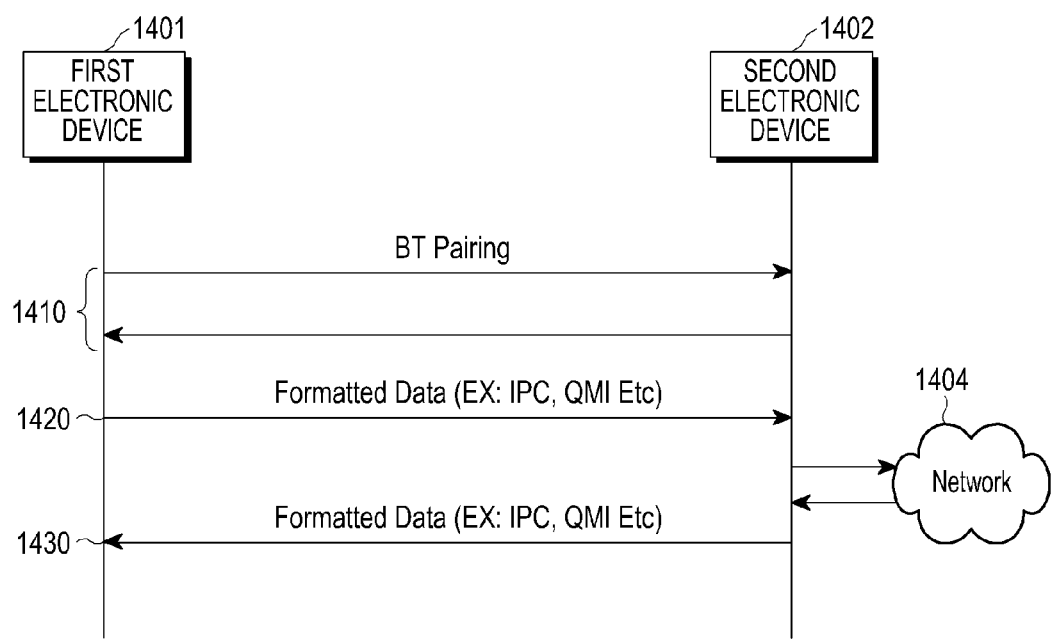

FIG. 14 illustrates a communication connection method according to an embodiment of the present disclosure.

In operation 1410, first and second electronic devices 1401 and 1402 may establish a BT pairing (or connection).

In operation 1420, the first electronic device 1401 may transmit data or a message having a configuration which can be analyzed by the first communication module of the first electronic device 1401 and/or the second communication module of the second electronic device 1402 to the second electronic device 1402 through a network 1404.

In operation 1430, the second electronic device 1402 may transmit data or a message having a configuration (or a format, a form, a protocol or the like) which can be analyzed by the first communication module of the first electronic device 1401 and/or the second communication module of the second electronic device 1402 to the first electronic device 1401 through the network 1404.

Figure 15:
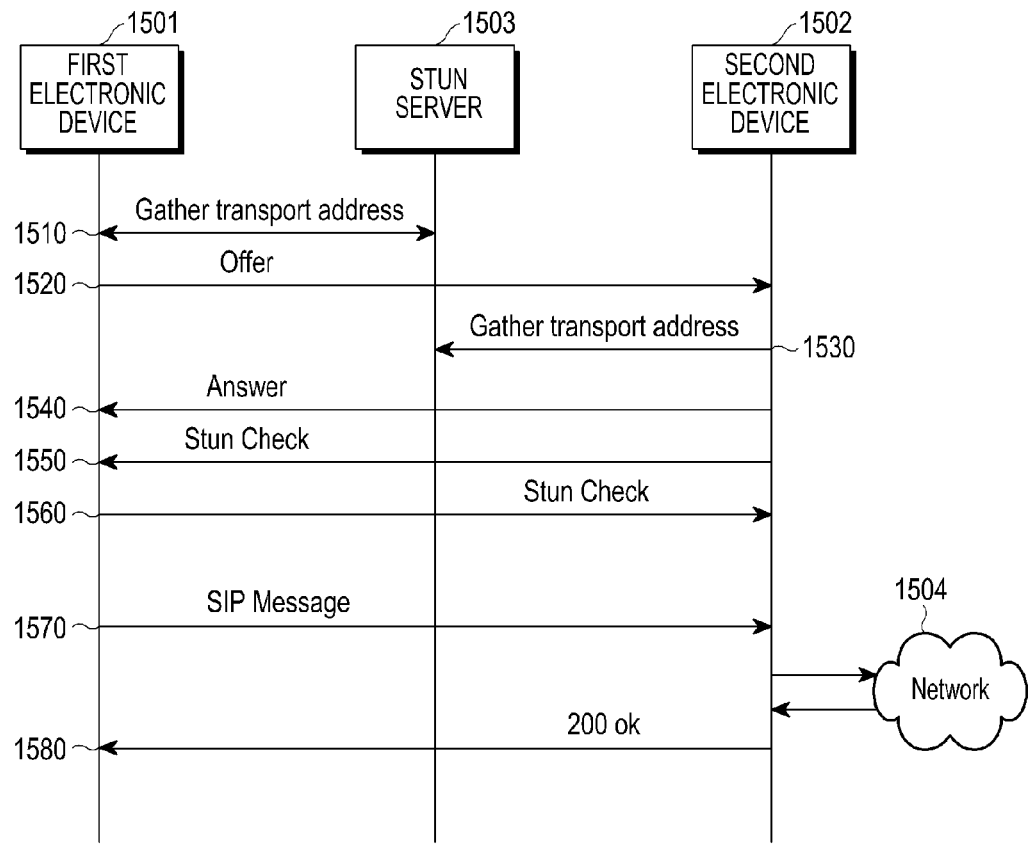

FIG. 15 illustrates a communication connection method according to an embodiment of the present disclosure.

In operation 1510, a first electronic device 1501 may make a request for an IP address and information on a port to a STUN server 1503 and receive the IP address and the information on the port from the STUN server 1503.

In operation 1520, the first electronic device 1501 may transmit an offer signal for a connection to a second electronic device 1502.

In operation 1530, the second electronic device 1502 may make a request for an IP address and information on a port to the STUN server 1503 and receive the IP address and the information on the port from the STUN server 1503.

In operation 1540, the second electronic device 1502 may transmit an answer signal in response to the offer signal.

In operation 1550, the second electronic device 1502 may transmit a STUN check signal for identifying the connection to the first electronic device 1501.

In operation 1560, the first electronic device 1501 may transmit the STUN check signal for identifying the connection to the second electronic device 1502.

In operation 1570, the first electronic device 1501 may transmit a Session Initiation Protocol (SIP) message to the second electronic device 1502 through a network 1504.

In operation 1580, the second electronic device 1502 may transmit a response message to the SIP message (for example, 200 ok) to the first electronic device 1501 through the network 1504.

Figure 16:
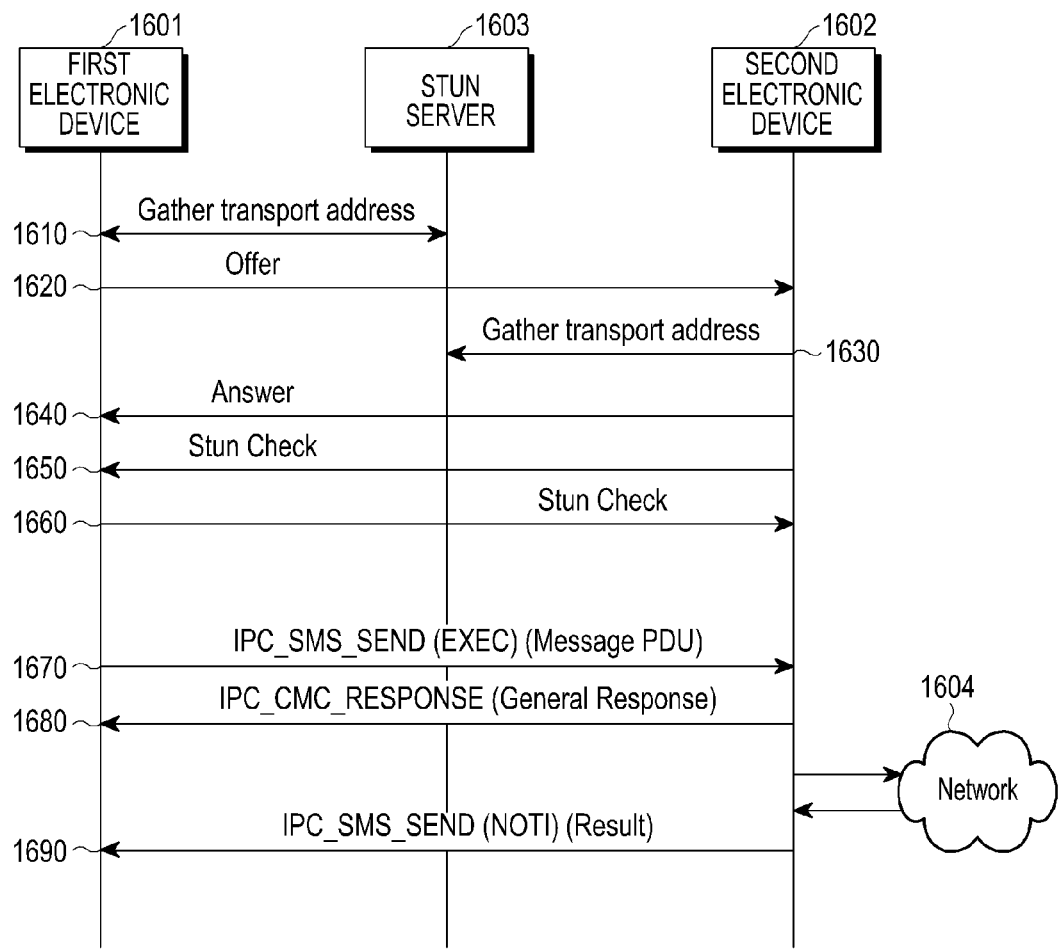

FIG. 16 illustrates a communication connection method according to an embodiment of the present disclosure.

In operation 1610, a first electronic device 1601 may make a request for an IP address and information on a port to a STUN server 1603 and receive the IP address and the information on the port from the STUN server 1603.

In operation 1620, the first electronic device 1601 may transmit an offer signal for a connection to a second electronic device 1602.

In operation 1630, the second electronic device 1602 may make a request for an IP address and information on a port to the STUN server 1603 and receive the IP address and the information on the port from the STUN server 1603.

In operation 1640, the second electronic device 1602 may transmit an answer signal in response to the offer signal.

In operation 1650, the second electronic device 1602 may transmit a STUN check signal for identifying the connection to the first electronic device 1601.

In operation 1660, the first electronic device 1601 may transmit the STUN check signal for identifying the connection to the second electronic device 1602.

In operation 1670, the first electronic device 1601 may transmit an IPC_SMS_SEND message for instructing to transmit an SMS message to the second electronic device 1602 through a network 1604. The IPC_SMS_SEND message may include a Protocol Data Unit (PDU) which comprises an SMS message content and control information such as receiver information.

In operation 1680, the second electronic device 1602 may transmit an IPC_CMD_RESPONSE message which is a general response message indicating reception of the IPC_SMS_SEND message to the first electronic device 1601 through the network 1604.

In operation 1690, the second electronic device 1602 may transmit the IPC_SMS_SEND message corresponding to a message which notifies of the result of the transmission of the SMS message to first electronic device 1601.

Figure 17:
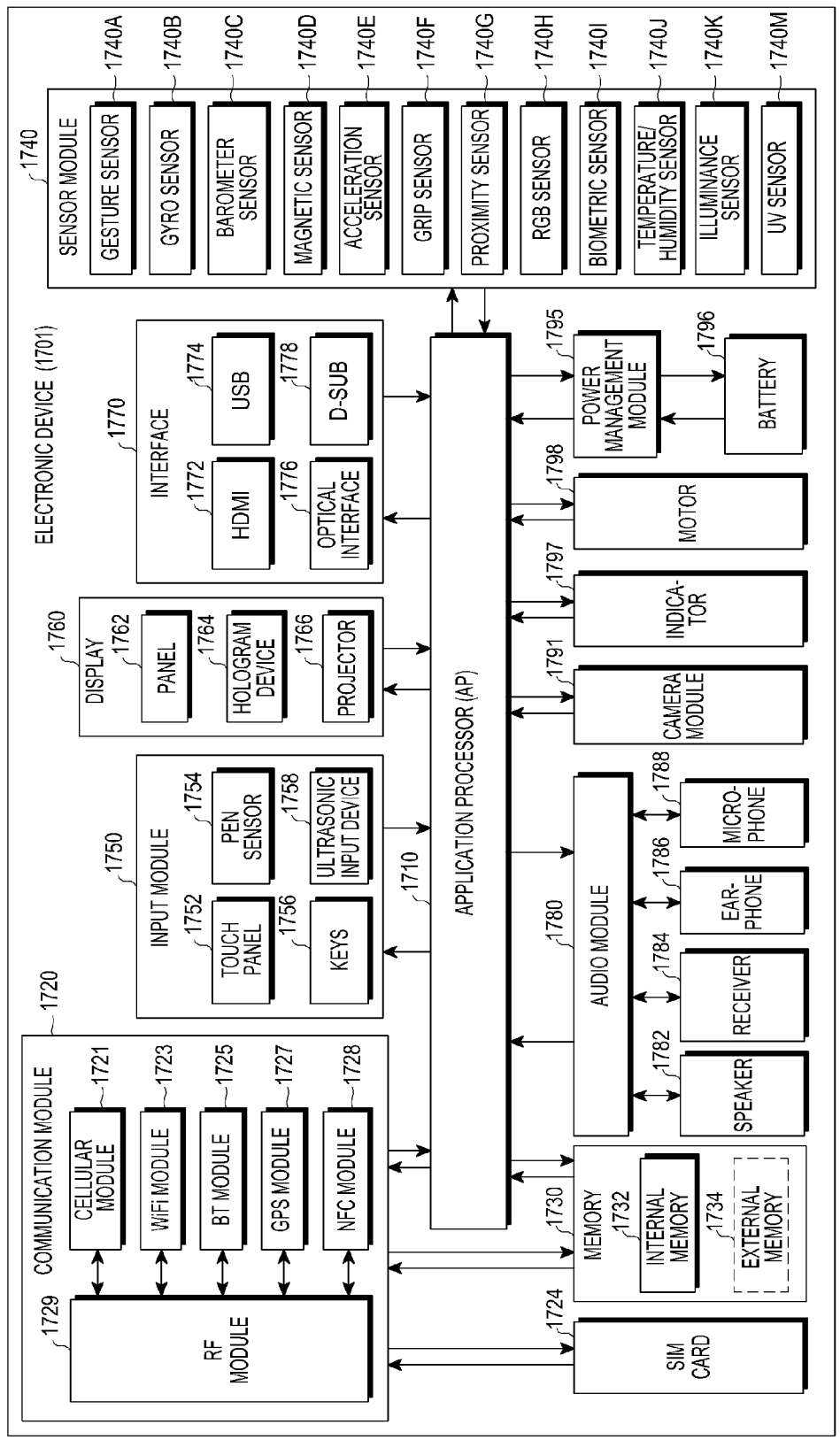
FIG. 17 is a block diagram of an electronic device according to an embodiment of the present disclosure.

FIG. 17 is a block diagram of an electronic device 1701 according to an embodiment of the present disclosure. The electronic device 1701 may constitute, for example, all or a part of the electronic device 101 shown in FIG. 1.

Referring to FIG. 17, the electronic device 1701 may include at least one application processor (AP) 1710, a communication module 1720, a subscriber identification module (SIM) card 1724, a memory 1730, a sensor module 1740, an input module 1750, a display 1760, an interface 1770, an audio module 1780, a camera module 1791, a power management module 1795, a battery 1796, an indicator 1797, and a motor 1798.

The AP 1710 may control a plurality of hardware or software components connected to the AP 1710 by driving an operating system or an application program and process various data including multimedia data and perform calculations. The AP 1710 may be implemented with, for example, a System on Chip (SoC). According to an embodiment, the AP 1710 may further include a Graphic Processing Unit (GPU) (not shown).

The communication module 1720 (for example, the communication interface 160) may perform data transmission/reception in communication between the electronic device 1701 (for example, the electronic device 101) and other electronic devices (for example, the electronic device 104 and the server 106) connected thereto through a network. According to an embodiment, the communication module 1720 may include a cellular module 1721, a WiFi module 1723, a BT module 1725, a Global Positioning System (GPS) module 1727, an NFC module 1728, and a Radio Frequency (RF) module 1729.

The cellular module 1721 may provide a voice, a call, a video call, SMS, or an Internet service through a communication network (for example, LTE, LTE-A, CDMA, WCDMA, UMTS, WiBro, GSM, or the like). Further, the cellular module 1721 may distinguish and authenticate electronic devices within a communication network by using a Subscriber Identification Module (for example, the SIM card 1724). According to an embodiment, the cellular module 1721 may perform at least some of the functions which can be provided by the AP 1710. For example, the cellular module 1721 may perform at least some of the multimedia control functions.

According to an embodiment, the cellular module 1721 may include a Communication Processor (CP) (not shown). Further, the cellular module 1721 may be implemented by, for example, an SoC. Although the elements such as the cellular module 1721 (for example, the communication processor), the memory 1730, and the power management module 1795 are illustrated to be separate from the AP 1710 in FIG. 17, the AP 1710 may be implemented to include at least some of the above described elements (for example, the cellular module 1721) according to an embodiment.

According to an embodiment, the AP 1710 or the cellular module 1721 (for example, communication control module 170) may load a command or data received from at least one of a non-volatile memory and other components connected to each of the AP 1710 and the cellular module 1721 to a volatile memory and process the loaded command or data. Further, the AP 1710 or the cellular module 1721 may store data received from or generated by at least one of other elements in a non-volatile memory.

Each of the WiFi module 1723, the BT module 1725, the GPS module 1727, and the NFC module 1728 may include a process for processing data transmitted/received through the corresponding module. In FIG. 17, the cellular module 1721, the WiFi module 1723, the BT module 1725, the GPS module 1727, and the NFC module 1728 are illustrated as blocks separated from each other, but at least some (for example, two or more) of the cellular module 1721, the WiFi module 1723, the BT module 1725, the GPS module 1727, and the NFC module 1728 may be included in one Integrated Chip (IC) or one IC package. For example, at least some (for example, a communication processor corresponding to the cellular module 1721 and a WiFi processor corresponding to the WiFi module 1723) processors corresponding to the cellular module 1725, the WiFi module 1723, the BT module 1728, the GPS module 1727, and the NFC module 1728, respectively, may be implemented as one SoC.

The RF module 1729 may transmit/receive data, for example, an RF signal. Although not illustrated, the RF module 1729 may include, for example, a transceiver, a Power Amp Module (PAM), a frequency filter, a Low Noise Amplifier (LNA), or the like. Further, the RF unit 1729 may include (not shown) a component for transmitting/receiving an electromagnetic wave in the air in radio communication, such as a conductor or a conducting wire. Although the cellular module 1721, the WiFi module 1723, the BT module 1725, the GPS module 1727, and the NFC module 1728 are illustrated to share one RF module 1729 in FIG. 17, at least one of the cellular module 1721, the WiFi module 1723, the BT module 1725, the GPS module 1727, and the NFC module 1728 may transmit/receive the RF signal through a separate RF module.

The SIM card 1724 may be a card including a Subscriber Identification Module and may be inserted into a slot formed in a particular portion of the electronic device. The SIM card 1724 may include unique identification information (for example, Integrated Circuit Card IDentifier (ICCID)) or subscriber information (for example, International Mobile Subscriber Identity (IMSI).

The memory 1730 (for example, memory 130) may include an internal memory 1732 or an external memory 1734. The internal memory 1732 may include (not shown) at least one of a volatile memory (for example, a Dynamic Random Access Memory (DRAM), a Static RAM (SRAM), a Synchronous DRAM (SDRAM), and/or the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and/or the like).

According to an embodiment, the internal memory 1732 may be a Solid State Drive (SSD). The external memory 1734 may further include (not shown) a flash drive, for example, a Compact Flash (CF), a Secure Digital (SD), a Micro-SD, a Mini-SD, an extreme Digital (xD), a Memory Stick, or the like. The external memory 1734 may be functionally connected to the electronic device 1701 through various interfaces. According to an embodiment, the electronic device 1701 may further include (not shown) a storage device (or storage medium) such as a hard drive.

The sensor module 1740 may measure a physical quantity or detect an operation status of the electronic device 1701, and convert the measured or detected information to an electronic signal. The sensor module 1740 may include, for example, at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H (for example, a red, green, and blue (RGB) sensor), a biometric sensor 1740I, a temperature/humidity sensor 1740J, an illumination sensor 1740K, and an Ultra Violet (UV) sensor 1740M. Additionally or alternatively, the sensor module 1740 may include, for example (not shown), an E-nose sensor, an electromyography (EMG) sensor, an electroencephalogram (EEG) sensor, an electrocardiogram (ECG) sensor, an Infrared (IR) sensor, an iris sensor, a fingerprint sensor, and/or the like. The sensor module 1740 may further include (not shown) a control circuit for controlling one or more sensors included in the sensor module 1740.

The input module 1750 may include a touch panel 1752, a (digital) pen sensor 1754, a key 1756, or an ultrasonic input device 1758. The touch panel 1752 may recognize a touch input by at least one of, for example, a capacitive type, a pressure type, an infrared type, or an ultrasonic type. The touch panel 1752 may further include (not shown) a control circuit. In the capacitive type, a physical contact or proximity recognition is possible. The touch panel 1752 may further include a tactile layer. In this case, the touch panel 1752 may provide a tactile reaction to the user.

The (digital) pen sensor 1754 may be implemented, for example, using a method identical or similar to a method of receiving a touch input of a user or using a separate recognition sheet. The key 1756 may include, for example, a physical button, an optical key or a keypad. The ultrasonic input device 1758 is a device which can detect an acoustic wave by a microphone (for example, microphone 1788) of the electronic device 1701 through an input tool generating an ultrasonic signal to identify data and can perform wireless recognition. According to an embodiment, the electronic device 1701 may receive a user input from an external device (for example, computer or server) connected to the electronic device 1701 by using the communication module 1720.

The display 1760 (for example, the display 150) may include a panel 1762, a hologram device 1764, and a projector 1766. The panel 1762 may be, for example, a Liquid Crystal Display (LCD) or an Active Matrix Organic Light Emitting Diode (AM-OLED). The panel 1762 may be implemented to be, for example, flexible, transparent, or wearable. The panel 1762 may be configured by the touch panel 1752 and one module. The hologram 1764 may show a stereoscopic image in the air by using interference of light. The projector 1766 may project light on a screen to display an image. For example, the screen may be located inside or outside the electronic device 1701. According to one embodiment, the display 1760 may further include a control circuit (not shown) for controlling the panel 1762, the hologram device 1764, or the projector 1766.

The interface 1770 may include, for example, a High-Definition Multimedia Interface (HDMI) 1772, a Universal Serial Bus (USB) 1774, an optical interface 1776, or a D-subminiature (D-sub) 1778. The interface 1770 may be included in, for example, the communication interface 160 illustrated in FIG. 1. Additionally or alternatively, the interface 1770 may include, for example (not shown), a Mobile High-definition Link (MHL) interface, a Secure Digital (SD) card/Multi-Media Card (MMC) interface, or an Infrared Data Association (IrDA) standard interface.

The audio module 1780 may bi-directionally convert a sound and an electronic signal. At least some components of the audio module 1780 may be included in, for example, the input/output interface 140 illustrated in FIG. 1. The audio module 1780 may convert sound information input or output through, for example, a speaker 1782, a receiver 1784, an earphone 1786, the microphone 1788, or the like.

The camera module 1791 is a device which can photograph an image and a dynamic image. According to an embodiment, the camera module 1791 may include (not shown) one or more image sensors (for example, a front lens or a back lens), a lens, an Image Signal Processor (ISP), or a flash (for example, an LED or xenon lamp).

The power managing module 1795 may manage power of the electronic device 1701. Although not illustrated, the power management module 1795 may include, for example, a Power Management Integrated Circuit (PMIC), a charger Integrated Circuit (IC), or a battery or fuel gauge.

The PMIC may be mounted within, for example, an integrated circuit or a SoC semiconductor. Charging methods may be classified into a wired charging method and a wireless charging method. The charger IC may charge a battery and prevent over voltage or over current from flowing from a charger. According to an embodiment, the charger IC may include a charger IC for at least one of the wired charging method and the wireless charging method. A magnetic resonance scheme, a magnetic induction scheme, or an electromagnetic scheme can be exemplified as the wireless charging method, and an additional circuit for wireless charging, such as a coil loop circuit, a resonance circuit, a rectifier circuit, and/or the like may be added.

The battery or fuel gauge may measure, for example, a remaining amount of battery, a charging voltage and current, or temperature. The battery 1796 may store or generate electricity and supply power to the electronic device 1701 by using the stored or generated electricity. The battery 1796 may include, for example, a rechargeable battery or a solar battery.

The indicator 1797 may display a particular status of the electronic device 1701 or a part thereof (for example, the AP 1710), for example, a booting status, a message status, a charging status, or the like. The motor 1798 may convert an electrical signal to a mechanical vibration. Although not illustrated, the electronic device 1701 may include a processing unit (for example, a GPU) for mobile TV support. The processing unit for supporting the mobile TV may process, for example, media data according to a standard of Digital Multimedia Broadcasting (DMB), Digital Video Broadcasting (DVB), media flow, or the like.

The described component elements of an electronic device according to various embodiments of the present disclosure may be formed of one or more components, and a name of a corresponding component element may be changed based on a type of electronic device. An electronic device according to various embodiments of the present disclosure may be formed to include at least one of the described component elements, and component elements may be omitted or additional component elements may be further included. Also, some of the components of the electronic device according to the present disclosure may be combined to form a single entity, and thus may equivalently execute functions of the corresponding components before being combined.

The term "module" used in the various embodiments of the present disclosure may refer to, for example, a unit including one or more combinations of hardware, software, and firmware. The module may be interchangeable with a term, such as a unit, a logic, a logical block, a component, or a circuit. The module may be the smallest unit of an integrated component or a part thereof. The module may be a minimum unit for performing one or more functions or a part thereof. The module may be mechanically or electronically implemented. For example, the module according to the various embodiments of the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least part of a device (for example, modules or functions thereof) or a method (for example, operations) according to the various embodiments of the present disclosure may be embodied by, for example, an instruction stored in a non-transitory computer readable storage medium provided in a form of a programming module. When the command is executed by one or more processors (for example, the processor 120), the one or more processors may execute a function corresponding to the command. The non-transitory computer-readable storage medium may be, for example, the memory 130. At least some of the programming modules may be implemented (for example, executed) by, for example, the processor 120. At least some of the programming modules may include, for example, a module, a program, a routine, a set of instructions or a process for performing one or more functions.

The non-transitory computer-readable recording medium may include magnetic media such as a hard disk, a floppy disk, and a magnetic tape, optical media such as a Compact Disc Read Only Memory (CD-ROM) and a DVD, magneto-optical media such as a floptical disk, and hardware devices specially configured to store and perform a program instruction (for example, programming module), such as ROM, RAM, a flash memory, and/or the like. In addition, the program instructions may include high level language codes, which can be executed in a computer by using an interpreter, as well as machine codes made by a compiler. The aforementioned hardware device may be configured to operate as one or more software modules in order to perform the operation of various embodiments of the present disclosure, and vice versa.

A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium stores instructions that are configured to, when executed by at least one processor, enable the at least one processor to perform at least one operation including receiving an input for communication with a third electronic device, designating at least one of a first communication module of the first electronic device and a second communication module of a second electronic device for the communication with the third electronic device, and controlling the first or second communication module for the communication with the third electronic device in response to the input.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A first electronic device comprising:
a storage configured to store instructions therein;
a first communication module configured to communicate data or a message; and
a processor,
wherein, upon execution of the instructions, the processor is configured to:
receive an input for communication with a third electronic device,
determine, for communication with the third electronic device, at least one of the first communication module and a second communication module of a second electronic device; and
control the first or second communication module for the communication with the third electronic device in response to the input.

2. The first electronic device of claim 1, wherein the processor is further configured to determine which one of the first and second communication modules will be used for transmitting a message based on communication related information.

3. The first electronic device of claim 2, wherein the communication related information includes at least one of setting information of the first electronic device, a type of a communication signal, a location or a type of a Subscriber Identity Module (SIM), a connection state with an external electronic device, a user input, a power state, a charging state, a network state, and a phone plan.

4. The first electronic device of claim 1, wherein the processor is further configured to:
transmit a contact number of the third electronic device to the second electronic device,
make a connection with the second electronic device, and
make a connection with the third electronic device.

5. The first electronic device of claim 4, wherein the connection with the second electronic device is released in a state where the connection with the third electronic device is made.

6. The first electronic device of claim 1, wherein the processor is further configured to:
display a screen part for selecting at least one of the first and second communication modules, and
receive an input using the screen part, the input selecting at least one of the first and second communication modules.

7. The first electronic device of claim 1, wherein the processor is further configured to:
display a first screen part for receiving the input for the communication with the third electronic device, and
display a second screen part for selecting at least one of the first and second communication modules.

8. The first electronic device of claim 1, wherein the processor is further configured to:
display a second screen part for selecting at least one of the first and second communication modules, and
store information on the selection of the at least one of the first and second communication modules in the storage.

9. The first electronic device of claim 1, wherein the processor is further configured to:

transmit a first message to the first communication module, and communicate with the third electronic device through the first communication module by using at least some of information included in the first message.

10. The first electronic device of claim 1, wherein the processor is further configured to:

transmit a first message to the first communication module and transmit the first message to the second electronic device by using the first communication module.

11. The first electronic device of claim 10, wherein the processor is further configured to re-configure the first message to a configuration which can be analyzed by the second communication module, and wherein the re-configured first message is transmitted to the second communication module.

12. The first electronic device of claim 10, wherein the first message is included in a second message transmitted to the second electronic device.

13. The first electronic device of claim 1, wherein the processor is further configured to:

receive an input for displaying a communication record, and display together a first communication record related to communication between the first communication module and the third electronic device and a second communication record related to communication between the second communication module and the third electronic device in response to the input for displaying the communication record.

14. The first electronic device of claim 13, wherein the processor is further configured to hide or inactivate the second communication record when the connection between the first electronic device and the second electronic device is released.

15. The first electronic device of claim 1, wherein the processor is further configured to:

display a first item corresponding to the first electronic device and a second item corresponding to the second electronic device, in response to an input for selecting the first item, control the first communication module to communicate with the third electronic device, and in response to an input for selecting the second item, control the second communication module to communicate with the third electronic device.

16. A non-transitory machine-readable storage medium storing a program to execute a method for performing communication by a first electronic device, the method comprising:

receiving an input for communication with a third electronic device;

determining at least one of a first communication module of the first electronic device and a second communication module of a second electronic device for the communication with the third electronic device; and controlling the first or second communication module for the communication with the third electronic device in response to the input.

17. A second electronic device comprising:

a storage configured to store instructions therein;

a second communication module configured to communicate data or a message; and a processor, wherein, upon execution of the instructions, the processor is configured to:

receive a first message for communication with a third electronic device from a first communication module of a first electronic device, transmit the first message to the second communication module, and communicate with the third electronic device by using at least some of information included in the first message.

18. The second electronic device of claim 17, wherein the processor is further configured to:

receive a second message related to the first message from the first electronic device, and obtain the first message by using at least some of information included in the second message.

19. The second electronic device of claim 17, wherein the processor is further configured to re-configure the first message to have a configuration which can be analyzed by the second communication module, and wherein the re-configured first message is transmitted to the second communication module.

20. The second electronic device of claim 17, wherein the first message includes a contact number of the third electronic device, and wherein the processor is further configured to:

make a first connection between the second electronic device and the first electronic device, make a second connection between the second electronic device and the third electronic devices, and release each of the first and second connections in a state where the first and third electronic devices are connected to each other.

* * * * *